(12) United States Patent
Uwazumi et al.

(10) Patent No.: US 6,794,028 B2
(45) Date of Patent: Sep. 21, 2004

(54) PERPENDICULAR MAGNETIC RECORDING MEDIUM AND A METHOD OF MANUFACTURING THE SAME

(75) Inventors: Hiroyuki Uwazumi, Nagano (JP); Yasushi Sakai, Nagano (JP); Tadaaki Oikawa, Nagano (JP); Miyabi Nakamura, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/227,621

(22) Filed: Aug. 23, 2002

(65) Prior Publication Data

US 2003/0064249 A1 Apr. 3, 2003

(30) Foreign Application Priority Data

Aug. 31, 2001 (JP) ........................................ 2001-264516

(51) Int. Cl.⁷ ............................... G11B 5/66; G11B 5/70
(52) U.S. Cl. ............................... 428/336; 428/694 TM; 428/694 TS; 428/694 TP; 428/216; 428/900; 427/128; 427/131; 204/192.2
(58) Field of Search .................... 428/694 TS, 694 TM, 428/694 TP, 336, 216, 900; 427/128, 131; 204/192.2

(56) References Cited

U.S. PATENT DOCUMENTS

| 5,049,451 A | * | 9/1991 | Lal et al. ..................... 428/611 |
| 5,679,473 A | | 10/1997 | Murayama et al. ...... 428/694 T |
| 5,736,262 A | * | 4/1998 | Ohkijima et al. ............ 428/611 |
| 5,815,342 A | * | 9/1998 | Akiyama et al. ........ 360/97.01 |
| 5,981,039 A | * | 11/1999 | Isono et al. .................. 428/199 |
| 6,086,974 A | | 7/2000 | Thiele et al. ............... 428/65.3 |
| 6,183,893 B1 | * | 2/2001 | Futamoto et al. ....... 428/694 TS |

(List continued on next page.)

FOREIGN PATENT DOCUMENTS

| JP | 02-227814 A | * | 9/1990 |
| JP | 02-287918 | | 11/1990 |
| JP | 8-255342 | | 10/1996 |
| JP | 2002-025031 A | * | 1/2002 |

OTHER PUBLICATIONS

US RE37,748, 6/2002, Chen et al. (withdrawn)*
JPO Abstract Translation of JP 02–227814–A (Clipped Image No. JP402227814A).*
English Translation of JP 02–227814–A (Doc. ID: PTO 02–3726).*
Derwent Abstract Translation of JP 2002–025031–A (Doc. ID: JP 2002025031 A).*
Machine Translation of JP 2002–025031–A.*

(List continued on next page.)

Primary Examiner—Holly Rickman
(74) Attorney, Agent, or Firm—Rossi & Associates

(57) ABSTRACT

A perpendicular magnetic recording medium has a granular magnetic layer and a nonmagnetic underlayer of a metal or an alloy having a hexagonal closest-packed (hcp) crystal structure. A seed layer of a metal or an alloy of a face-centered cubic (fcc) crystal structure is provided under the nonmagnetic underlayer. Such a perpendicular magnetic recording medium exhibits excellent magnetic characteristics even when the thickness of the underlayer or the total thickness of the underlayer and the seed layer is very thin. Excellent magnetic characteristics can be obtained even when of the substrate is not preheated. Accordingly, a nonmagnetic substrate, such as a plastic resin can be employed to reduce the manufacturing cost.

8 Claims, 2 Drawing Sheets

U.S. PATENT DOCUMENTS

| | | |
|---|---|---|
| 6,248,416 B1 | 6/2001 | Lambeth et al. ............ 428/65.3 |
| 6,416,839 B1 * | 7/2002 | Xuan et al. ................. 428/65.4 |
| 6,447,936 B1 * | 9/2002 | Futamoto et al. ..... 428/694 TM |
| 6,524,724 B1 * | 2/2003 | Cheng et al. ................ 428/611 |
| 6,589,669 B2 | 7/2003 | Uwazumi et al. ............ 428/611 |
| 2002/0018917 A1 * | 2/2002 | Sakai et al. ........... 428/694 TM |
| 2002/0058159 A1 * | 5/2002 | Kubota et al. ........ 428/694 TM |
| 2003/0049495 A1 | 3/2003 | Sakai et al. ........... 428/694 TM |
| 2003/0064249 A1 * | 4/2003 | Uwazumi et al. ...... 428/694 BA |

OTHER PUBLICATIONS

"High Performance CoPtCrO Single Layered Perpendicular Media with No Recording Demagnetization"; Oikawa et al.:IEEE TRansactions on Magnetics, vol. 36, No. 5; Sep. 2000; pp. 2393–2395.

U.S. patent application Ser. No. 10/227,622, Uwazumi et al., filed on Aug. 2002.

* cited by examiner

PERPENDICULAR MAGNETIC RECORDING MEDIUM AND A METHOD OF MANUFACTURING THE SAME

BACKGROUND

As a technique for achieving a high density magnetic recording, a perpendicular magnetic recording has been targeted as an alternative to a conventional longitudinal magnetic recording. In a magnetic recording layer of a perpendicular magnetic recording medium, a crystalline film of CoCr alloy having a hexagonal closest packed (hcp) crystal structure principally has been studied. To make a perpendicular magnetic recording possible, the crystal alignment is controlled so that the c-axis of each crystal grain is perpendicular to the film surface, i.e., the c-plane parallel to the film surface. For addressing a higher recording density in a perpendicular magnetic recording medium, attempts have been made to minimize the grain size and to reduce the dispersion of the grain size of the CoCr alloy composing the magnetic recording layer, and to reduce magnetic interaction between crystal grains.

A technique has been proposed to achieve a high density recording in a longitudinal magnetic recording medium by reducing magnetic interaction between crystal grains, in which a layer of nonmagnetic and non-metallic substance such as oxide or nitride, is formed at the grain boundary of a crystal grain composing a magnetic recording layer. This magnetic layer is called "a granular magnetic layer," and disclosed in Japanese Unexamined Patent Application Publication Hei 8-255342 and U.S. Pat. No. 5,679,473, for example. The magnetic grains in the granular magnetic layer are three dimensionally isolated with each other by the nonmagnetic and non-metallic grain boundary. Since magnetic interaction between magnetic grains decreases, "zigzag domain wall" in the transition region of a recording bit is suppressed, which is considered to result in noise reduction.

On this background, the use of the granular magnetic layer has been proposed in the magnetic recording layer of a perpendicular magnetic recording medium. For example, IEEE Trans. Mag., vol. 36, p. 2393(2000) discloses a perpendicular magnetic recording medium that comprises an underlayer of ruthenium (Ru) and a magnetic layer of a CoPtCrO alloy having a granular structure. The document shows that the c-axis alignment of crystal grains composing the magnetic layer enhances as the ruthenium underlayer becomes thicker, bringing about improvement in magnetic characteristics and electromagnetic conversion performances of the magnetic recording layer. However, the thickness of the ruthenium (Ru) underlayer of at least 40 nm is necessary to obtain a granular perpendicular magnetic recording medium that exhibits excellent characteristics.

A so-called double-layered perpendicular magnetic recording medium has been proposed, where a soft magnetic backing layer is provided under the magnetic recording layer to enhance sharpness of the magnetic field produced at the head position. To achieve a high density recording in a magnetic recording medium with this structure, it is considered essential that the thickness of the nonmagnetic layer provided between the magnetic recording layer and the soft magnetic layer be 20 nm or thinner. This places a restriction on the magnetic recording medium. Even in a structure without the soft magnetic backing layer, it is desirable for the thickness of the ruthenium underlayer to be thin from the viewpoint of reducing the manufacturing cost since ruthenium is an expensive rare metallic element.

Accordingly, there is a need for a perpendicular magnetic recording medium that exhibits excellent magnetic characteristics and superior electromagnetic conversion performance at a low cost. The present invention addresses this need.

SUMMARY OF THE INVENTION

The present invention relates to a perpendicular magnetic recording medium and a method of manufacturing the recording medium. In particular, the present invention relates to a perpendicular magnetic recording medium that can be mounted on an external memory of a computer or other magnetic recording apparatus, and to a method of manufacturing such a recording medium.

According to one aspect of the present invention, a perpendicular magnetic recording medium has a nonmagnetic substrate, and at least a seed layer, a nonmagnetic underlayer, a magnetic layer, and a protective film sequentially laminated on the substrate. The magnetic layer can be composed of ferromagnetic crystal grains and nonmagnetic grain boundaries mainly composed of oxide. The nonmagnetic underlayer can be composed of a metal or an alloy having a hexagonal closest-packed (hcp) crystal structure. The seed layer can be composed of a metal or an alloy having a face-centered cubic (fcc) crystal structure. The nonmagnetic substrate can be composed of a plastic resin.

The hexagonal closest-packed (hcp) crystal structure composing the nonmagnetic underlayer can control the crystal alignment of the granular magnetic layer. The metal composing the nonmagnetic underlayer can be selected from Ti, Re, Ru, and Os, and the alloy composing the nonmagnetic underlayer can contains at least one element selected from Ti, Re, Ru, and Os.

The face-centered cubic (fcc) crystal structure composing the seed layer can control the crystal alignment of the underlayer. The metal composing the seed layer can be selected from Cu, Au, Pd, Pt, and Ir. The alloy composing the seed layer can contain at least an element selected from Cu, Au, Pd, Pt, and Ir, or can contain at least Ni and Fe.

A nonmagnetic alignment control layer can be further provided between the seed layer and the nonmagnetic substrate. The nonmagnetic alignment control layer can be composed of a metal or an alloy that has a body-centered cubic (bcc) crystal structure or an amorphous structure. The metal composing the nonmagnetic alignment control layer can be selected from Nb, Mo, Ta, and W. The alloy composing the nonmagnetic alloy can contain at least one element selected from Nb, Mo, Ta, and W. A material having an amorphous structure such as NiP or CoZr also can be used.

According to another aspect of the present invention, a method of manufacturing a perpendicular magnetic recording medium comprises the steps of depositing the layers and the film of the perpendicular magnetic recording medium described above. Each of the steps of depositing these layers and the film can be carried out while the temperature of the nonmagnetic substrate is lower than 80° C. or without preheating the nonmagnetic substrate.

DETAILED DESCRIPTION

Now, the preferred embodiments of the present invention will be described with reference to the accompanying drawings.

Figure 1:
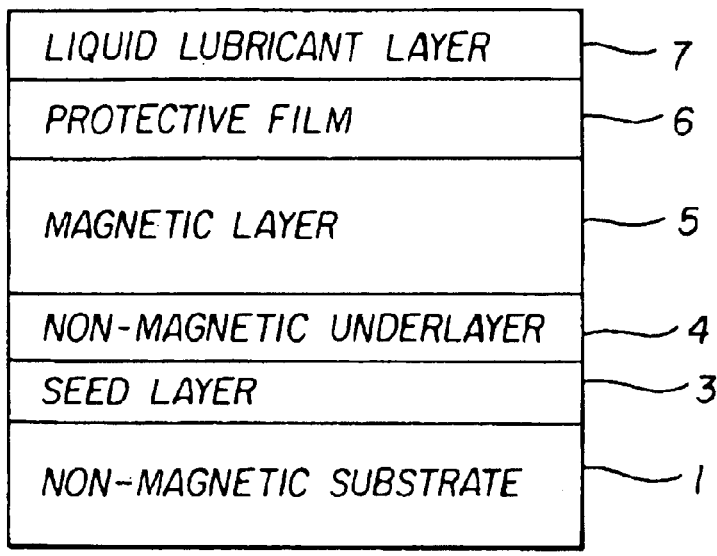
FIG. 1 schematically illustrates a cross-sectional view of a structure of an embodiment of a perpendicular magnetic recording medium according to the present invention.

Referring to FIG. 1, a perpendicular magnetic recording medium of the present invention includes a nonmagnetic substrate 1 and a seed layer 3, a nonmagnetic underlayer 4, a magnetic layer 5, and a protective film 6 laminated in this order on the nonmagnetic substrate 1. The protective film 6 is coated with a liquid lubricant layer 7.

Figure 2:
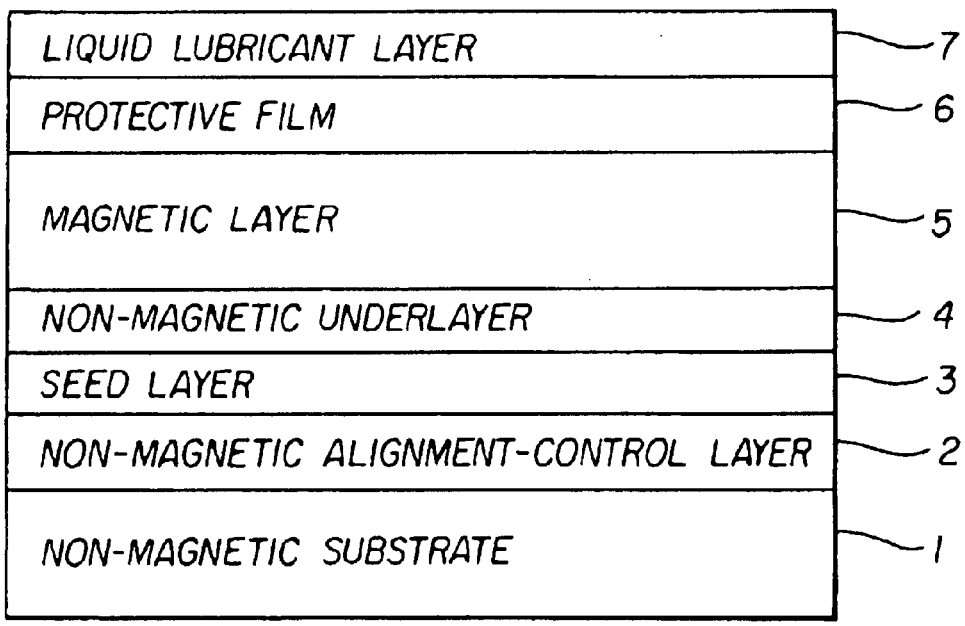
FIG. 2 schematically illustrates a cross-sectional view similar to FIG. 1, but illustrates another embodiment of a perpendicular magnetic recording medium according to the present invention.

FIG. 2 is an embodiment similar to the embodiment of FIG. 1, but includes a nonmagnetic alignment control layer 2 between the nonmagnetic substrate 1 and the seed layer 3

In both embodiments, the nonmagnetic substrate 1 can be formed of NiP-plated aluminum alloy, strengthened glass, or crystallized glass, which are conventionally used in a substrate of a typical magnetic recording medium. When substrate heating is unnecessary, a plastic substrate made by injection molding of a plastic resin, such as polycarbonate or polyolefin, can be used.

The magnetic layer 5 is a so-called granular magnetic layer. This layer has ferromagnetic crystal grains, between which nonmagnetic grain boundaries are formed of nonmagnetic metal oxide or metal nitride. The magnetic layer 5 with such a structure can be deposited by sputtering a ferromagnetic metallic target containing the oxide or nitride that constructs the grain boundary. Alternatively, the magnetic layer can be deposited by reactive sputtering a ferromagnetic metallic target under an argon gas atmosphere containing oxygen or nitrogen.

While the material for laminating the ferromagnetic crystals is not limited to a specific material, an alloy of CoPt system is preferable. To reduce recording media noise, in particular, it is preferable to add at least one element selected from Cr, Ni, and Ta to the CoPt alloy. To form a stable granular structure, it is preferable to form nonmagnetic grain boundaries using an oxide of at least one element selected from Cr, Co, Si, Al, Ti, Ta, Hf, and Zr. The magnetic layer 5 should have some thickness to allow sufficient head regeneration output and achieve a desired recording resolution.

The protective film 6 can be a thin film composed mainly of carbon, for example. The liquid lubricant layer 7 can be composed of a perfluoropolyether lubricant, for example.

The nonmagnetic underlayer 4 is composed of a metal or an alloy having a hexagonal closest-packed (hcp) crystal structure. To control the crystal alignment of the granular magnetic layer 5, the nonmagnetic underlayer 4 can be composed of a metal selected from Ti, Re, Ru, and Os, or an alloy containing at least one element selected from Ti, Re, Ru, and Os.

The seed layer 3 is composed of a metal or an alloy having a face-centered cubic (fcc) crystal structure. The seed layer 3 can be composed of a metal selected from Cu, Au, Pd, Pt, and Ir, an alloy containing at least one element selected from Cu, Au, Pd, Pt, and Ir, or an alloy containing at least Ni and Fe. When the seed layer 3 having an fcc crystal structure is laminated on a nonmagnetic substrate 1, the (111) plane that is the closest-packed plane of the fcc crystal structure tends to align parallel to the film surface. The crystal grains of the nonmagnetic underlayer 4 growing on the crystal grains of the seed layer 3 aligned in the (111) plane have a tendency to grow so as to minimize the strain energy due to lattice mismatch between the crystal grain of the underlayer 4 and the crystal grain of the seed layer 3. As a result, the hcp (002) plane of the nonmagnetic underlayer 4 tends to align parallel to the film surface.

When a granular magnetic layer 5 is laminated on the nonmagnetic underlayer 4 in this crystal alignment condition, the metal crystal grains of the magnetic layer 5 having the hcp crystal structure also tends to grow with their (002) plane aligning parallel to the film surface. This leads to a perpendicular magnetic recording medium having an excellent magnetic characteristic.

The lattice matching between the seed layer 3 and the nonmagnetic underlayer 4 and the lattice matching between the nonmagnetic underlayer 4 and the granular magnetic layer 5 are favorable if the materials of the seed layer 3 and the nonmagnetic underlayer 4 are appropriately chosen from the materials listed below. The preferable materials for the seed layer 3 include a metal selected from Cu, Au, Pd, Pt, and Ir, an alloy containing at least one element selected from Cu, Au, Pd, Pt, and Ir, and an alloy containing at least Ni and Fe. The preferable materials for the nonmagnetic underlayer 4 include a metal selected from Ti, Re, Ru, and Os, and an alloy containing at least an element selected from Ti, Re, Ru, and Os. A perpendicular magnetic recording medium using these materials exhibits a superior magnetic characteristic.

The thickness of the seed layer 3 can be at least 3 nm, more preferably 5 nm or more to control the crystal orientation of the nonmagnetic underlayer 4. In a double-layered perpendicular magnetic recording medium with a soft magnetic backing layer provided under the seed layer 3 in particular, the seed layer is desirable to be as thin as possible insofar as the crystal alignment of the nonmagnetic underlayer 4 is possible to be controlled, because the magnetic layer and the soft magnetic backing layer are preferably designed to be closely positioned with each other.

The thickness of the nonmagnetic underlayer 4 can be at least 2 nm, preferably 5 nm or more to control the crystal orientation of the granular magnetic layer 5. The underlayer 4 is desirable to be as thin as possible to reduce the manufacturing cost and for proximity of the magnetic layer and the soft magnetic backing layer in a double-layered perpendicular magnetic recording medium insofar as control of the crystal orientation of the granular magnetic layer 5 is possible.

In manufacturing a double-layered perpendicular magnetic recording medium, the soft magnetic backing layer can be composed of a NiFe soft magnetic alloy having a fcc structure, or a NiFe soft magnetic alloy layer having an fcc structure with a minimum thickness can be provided just over the soft magnetic backing layer. The control of the crystal orientation of the nonmagnetic underlayer 4 is possible regarding this NiFe soft magnetic alloy layer as a seed layer 3. The distance between the magnetic layer and the soft magnetic backing layer in this case is substantially equal to the thickness of the nonmagnetic underlayer 4. Thus, by making the underlayer thin, superior characteristics can be achieved in the perpendicular magnetic recording medium.

The nonmagnetic alignment control layer 2 is composed of a metal or an alloy having a body-centered cubic (bcc) crystal structure or an amorphous structure. By providing a nonmagnetic alignment control layer 2 having this structure, the tendency to align in (111) plane is more pronounced in the crystal grain of the seed layer 3 having the fcc crystal structure. Thus, the crystal alignment of the nonmagnetic underlayer 4 can be enhanced, resulting in improvement of the magnetic characteristics of the magnetic layer.

This effect of the alignment control layer is most significant when the material having the bcc structure is a nonmagnetic metal selected from Nb, Mo, Ta, and W, or a nonmagnetic alloy containing at least one element selected from Nb, Mo, Ta, and W. A material having an amorphous structure such as NiP or CoZr can also be employed.

The thickness of the nonmagnetic alignment control layer 2 can be at least 3 nm, more preferably 5 nm or more for controlling the crystal alignment of the seed layer 3.

According to the present method of manufacturing a perpendicular magnetic recording medium, the deposition processes can be conducted at temperatures lower than 80° C., so that the substrate 1 need not be preheated, which is commonly done in the conventional process of manufacturing a magnetic recording medium. A perpendicular magnetic recording medium according to the invention having the structure shown in FIGS. 1 or 2 exhibits excellent characteristics even if the substrate preheating step is omitted. Consequently, the production process can be simplified by omitting the substrate preheating step, to reduce the manufacturing cost. Omitting the substrate preheating step also allows use of a nonmagnetic substrate made of a molded plastic resin, such as polycarbonate or polyolefin.

The following describes specific examples of embodiments of the present invention. The examples are merely for illustrating a spirit of the invention, not to limit the scope of the present invention.

In Example 1, the nonmagnetic substrate 1 is a polycarbonate substrate of 3.5" disk made by injection molding. The substrate 1 was cleaned and introduced into a sputtering apparatus. Without preheating the substrate 1, a platinum seed layer 3 having a thickness of 5 nm was deposited under an argon gas pressure of 5 mTorr. Subsequently, a nonmagnetic underlayer 4 of ruthenium having a thickness in the range from 0 to 40 nm was deposited under an argon gas pressure of 5 mTorr. Then, a granular magnetic layer 5 having a thickness of 30 nm was deposited by an RF sputtering method using a target of $Co_{76}Cr_{12}Pt_{12}$ with the addition of 10 mol % $SiO_2$ under an argon gas pressure of 5 mTorr. After depositing a carbon protective film having a thickness of 10 nm on the granular magnetic layer, the resulting substrate was taken out from the sputtering apparatus and coated with a liquid lubricant to a thickness of 1.5 nm. Thus, a perpendicular magnetic recording medium having the structure shown in FIG. 1 was produced.

Figure 3:
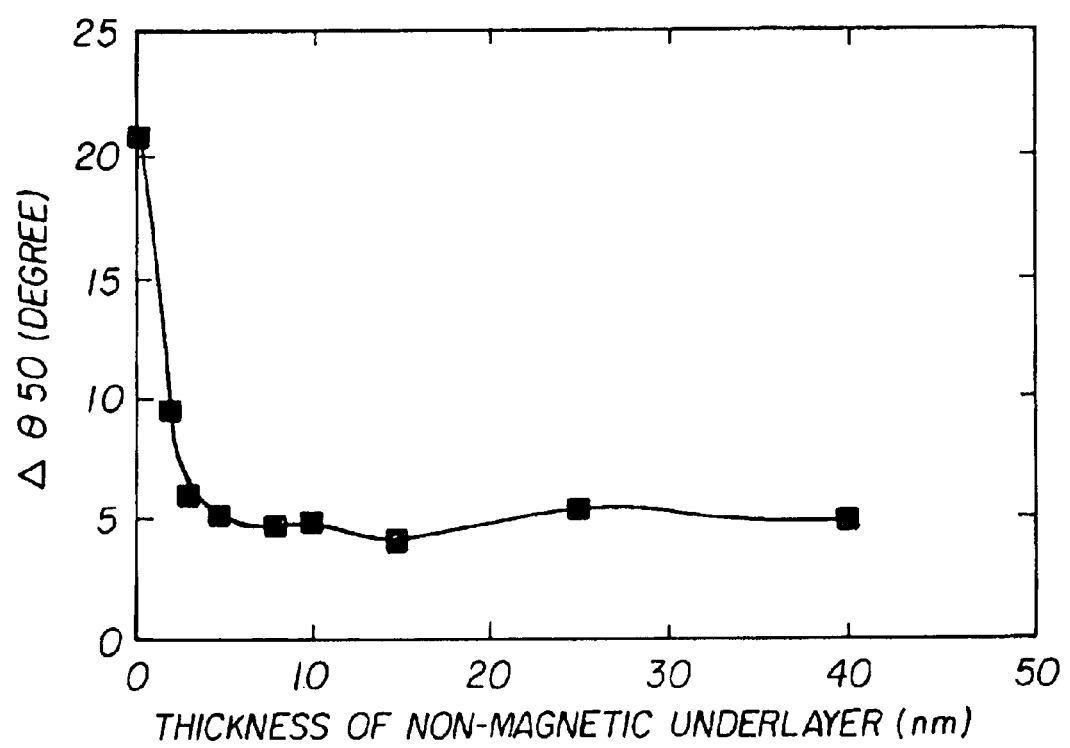
FIG. 3 is a graph for illustrating the relationship between $\Delta\theta_{50}$ value and the thickness of the nonmagnetic underlayer, in which $\Delta\theta_{50}$ is a half-width of a rocking curve of hcp (002) plane of the CoCrPt magnetic layer obtained by an X-ray diffraction method.
Figure 1:
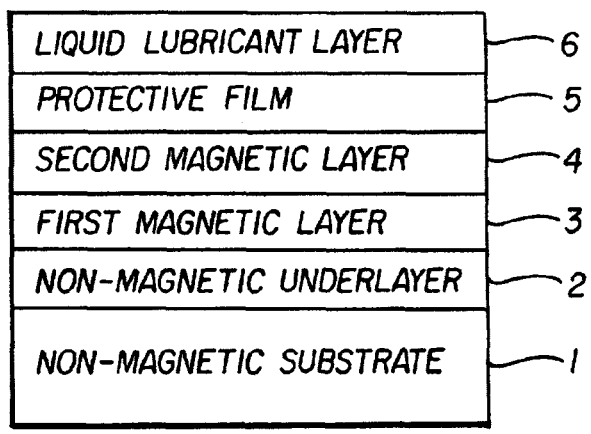
Figure 2:
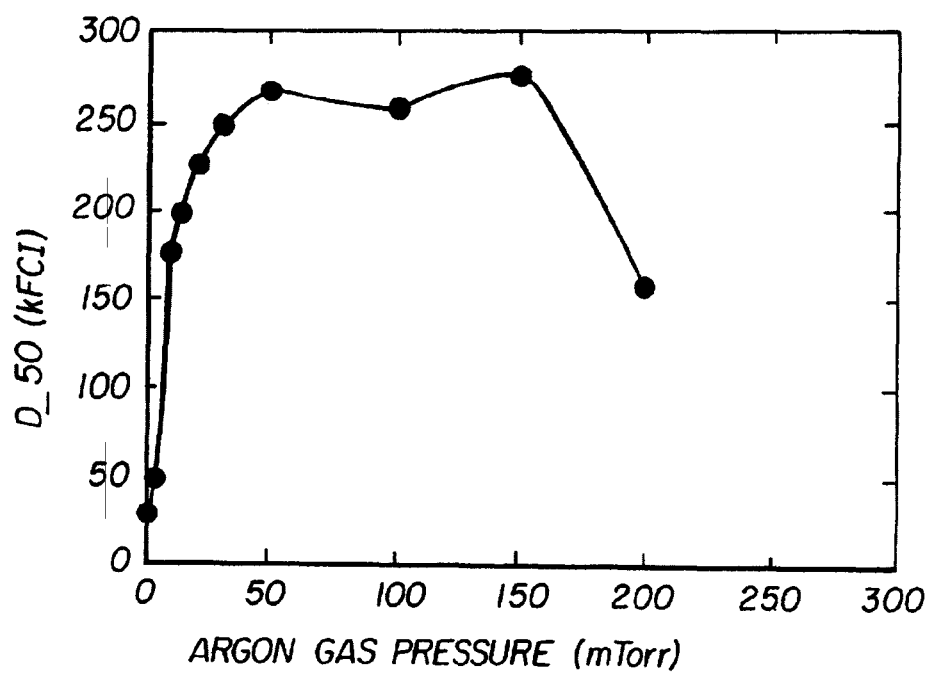
Figure 1:
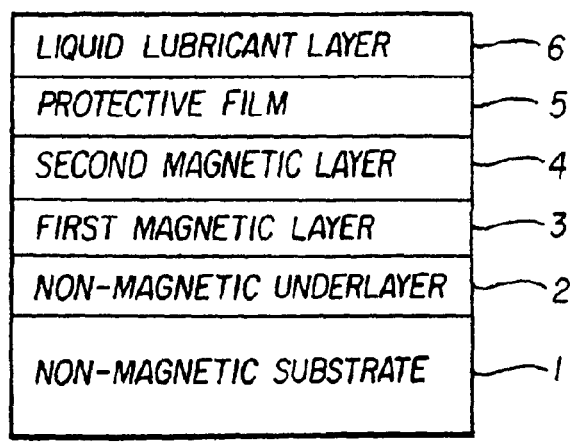
Figure 2:
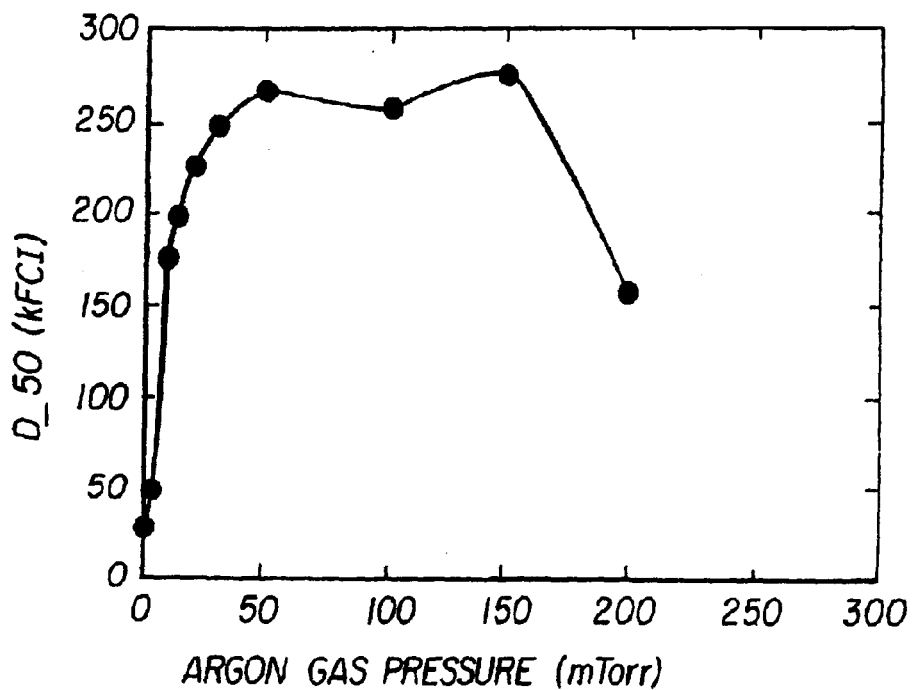
Figure 1:
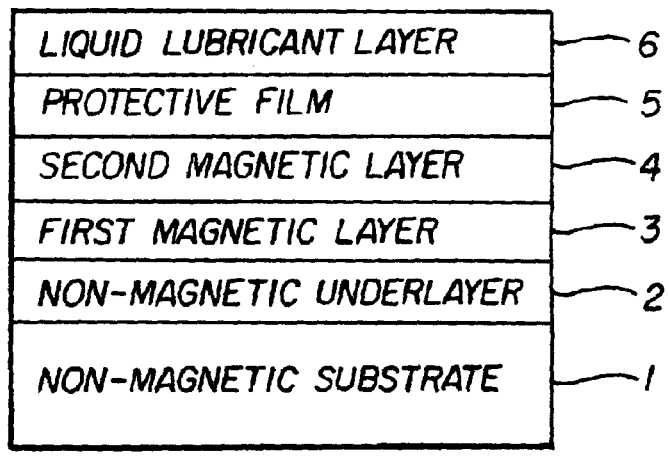
Figure 2:
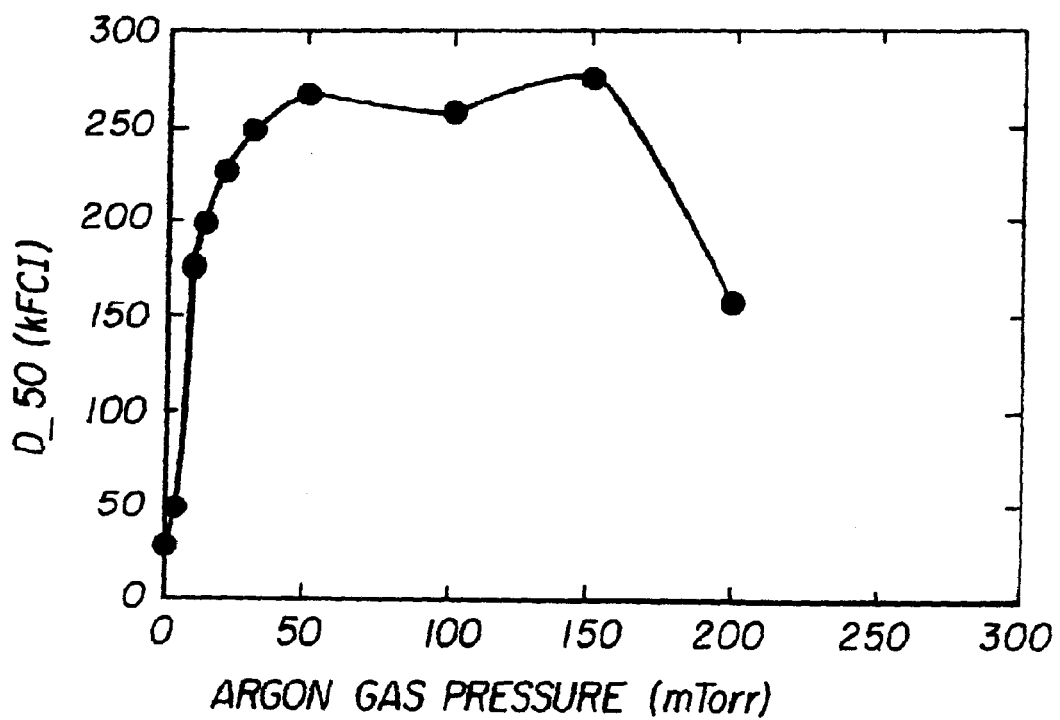
Figure 1:
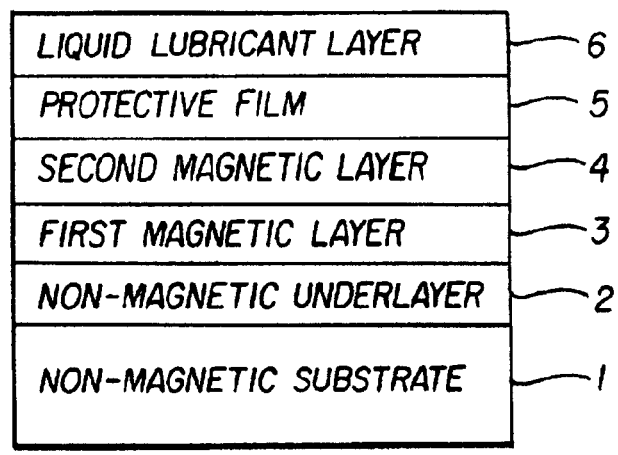
Figure 2:
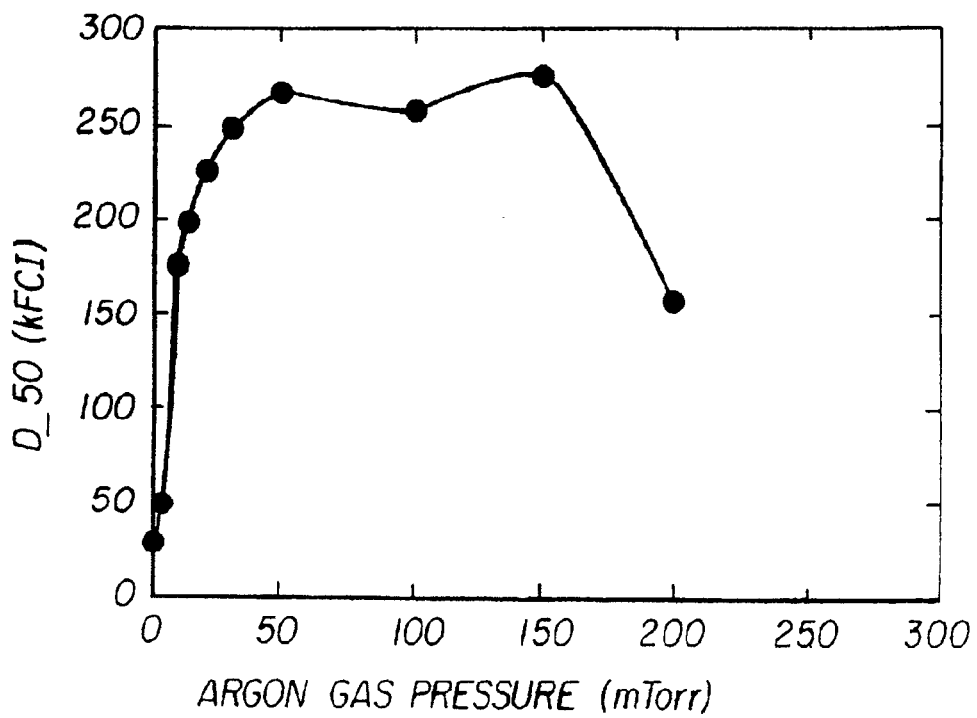
Figure 1:
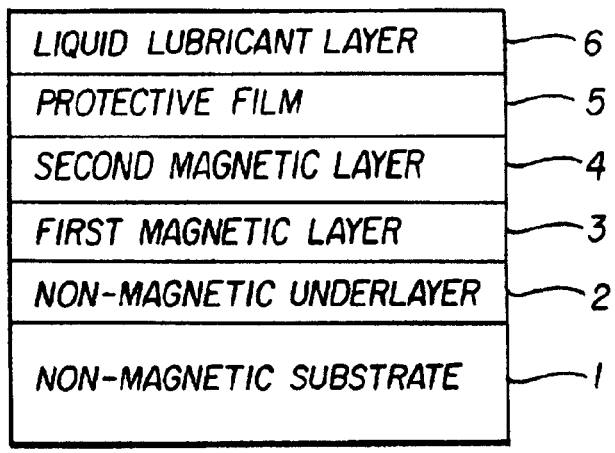
Figure 2:
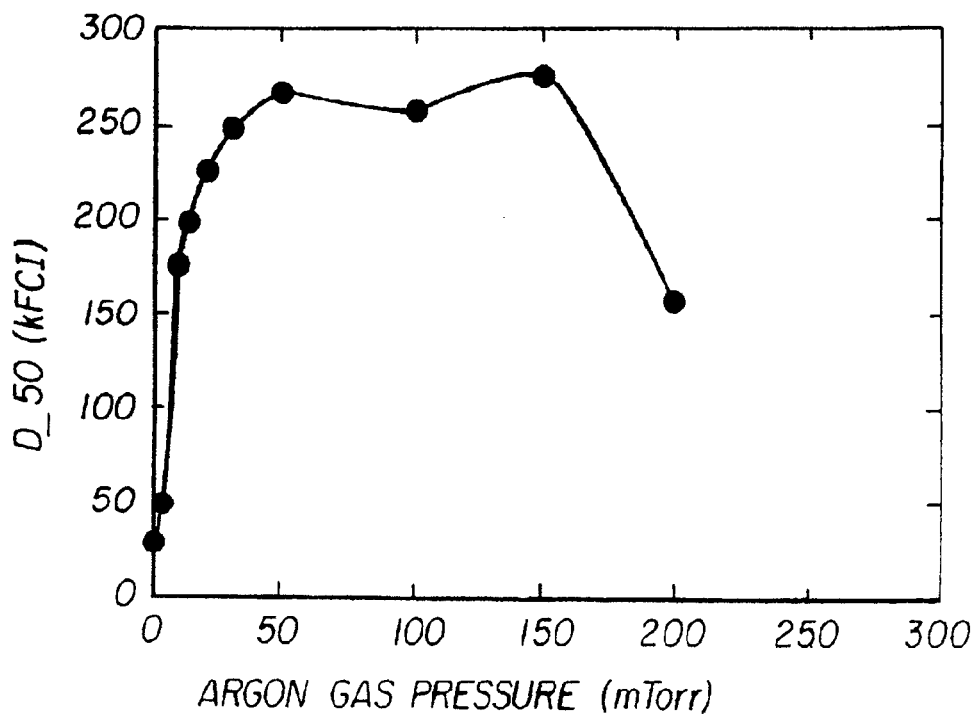

FIG. 3 is a graph illustrating the crystal alignment of the magnetic layer 5 obtained by an X-ray diffraction method. The abscissa represents the thickness of the nonmagnetic underlayer 4, and the ordinate represents $\Delta\theta_{50}$ which, is a half-width of a rocking curve taken for (002) plane of the CoCrPt magnetic layer having a hcp structure. Accordingly, a smaller $\Delta\theta_{50}$ value in FIG. 3 means a stronger (002) plane alignment in the plane of the CoCrPt magnetic layer.

The $\Delta\theta_{50}$ value is about 20° when the magnetic layer 5 is laminated without a nonmagnetic underlayer 4 on the seed layer 3, that is, when the nonmagnetic underlayer thickness is zero nm in FIG. 3. However, the $\Delta\theta_{50}$ value abruptly drops as the thickness of the nonmagnetic underlayer 4 laminated on the seed layer 3 increases. The $\Delta\theta_{50}$ value decreases to about 6° at 3 nm thickness and about 5° at 5 nm thickness. The $\Delta\theta_{50}$ value does not significantly change even if the thickness of the nonmagnetic underlayer is increased over 5 nm. This result implies that the thickness of the nonmagnetic underlayer is favorably at least 3 at nm, more preferably at 5 nm or more, to control the crystal alignment of the magnetic layer.

In Example 2, a set of perpendicular magnetic recording media having the structure shown in FIG. 1 was produced using various materials for the nonmagnetic underlayer 4. The conditions in the laminating processes were the same as those in Example 1, except that the thickness of the nonmagnetic underlayer was maintained at 5 nm. Table 1 summarizes the materials of the nonmagnetic underlayer 4, crystal structure of the underlayer 4, coercive force Hc, squareness ratio S, and $\Delta\theta_{50}$ value of the thus produced set of perpendicular magnetic recording media. The $\Delta\theta_{50}$ value is a half-width of a rocking curve of the diffraction line of hcp (002) plane of the CoCrPt magnetic layer. The coercive force Hc and the squareness ratio S were measured using a vibrating sample magnetometer VSM applying a magnetic field perpendicular to the film surface. Table 1 also shows evaluation results for a perpendicular magnetic recording medium having a nonmagnetic underlayer composed of Ta or Cr with a bcc structure, for comparison.

TABLE 1

| Material of underlayer | Crystal structure of underlayer | Hc (Oe) | Squareness ratio (S) | $\Delta\theta_{50}$ (degree) |
|---|---|---|---|---|
| Ru | hcp | 3020 | 0.99 | 5.1 |
| Re | hcp | 3430 | 0.95 | 4.8 |
| Os | hcp | 2980 | 0.92 | 5.9 |
| Ti | hcp | 2440 | 0.89 | 7.2 |
| Ru-20% W | hcp | 3310 | 0.98 | 4.3 |
| Ti-10% Cr | hcp | 2560 | 0.91 | 7.0 |
| Ta | bcc | 820 | 0.22 | 22.9 |
| Cr | bcc | 590 | 0.35 | 19.3 |

Excellent magnetic characteristics have been demonstrated in both the coercive force Hc and the squareness ratio S when the materials having the hcp structure were used for the nonmagnetic underlayer as compared with the case where Ta or Cr having a bcc structure was used for the nonmagnetic underlayer. The $\Delta\theta_{50}$ values are suppressed to low values, which indicate a strong (002) plane alignment in the plane of the magnetic layer.

In Example 3, a set of magnetic recording media having the structure shown in FIG. 1 was produced by laminating a seed layer 3 using various materials. The conditions in the laminating processes were the same as those in Example 1, except that the nonmagnetic underlayer was formed of ruthenium with a 5 nm thickness. Table 2 summarizes the materials of the seed layer 3, crystal structure of the seed layer, coercive force Hc, squareness ratio S, and $\Delta\theta_{50}$ value of the thus produced set of perpendicular magnetic recording media. The $\Delta\theta_{50}$ value is a half-width of a rocking curve of the diffraction line of hcp (002) plane of the CoCrPt magnetic layer. Table 2 also shows evaluation results for a perpendicular magnetic recording medium having a seed layer of Ta or Cr with a bcc structure, for comparison.

TABLE 2

| Material of seed layer | Crystal structure of seed layer | Hc (Oe) | Squareness ratio (S) | $\Delta\theta_{50}$ (degree) |
|---|---|---|---|---|
| Cu | fcc | 2780 | 0.89 | 4.3 |
| Au | fcc | 2990 | 0.92 | 5.9 |
| Pd | fcc | 3120 | 0.98 | 4.9 |
| Pt | fcc | 3020 | 0.99 | 5.1 |
| Ir | fcc | 3350 | 0.88 | 6.8 |
| Cu-10% Au | fcc | 2880 | 0.90 | 5.3 |
| Ni-15% Fe-30% Cu | fcc | 3070 | 0.93 | 6.6 |
| Ta | bcc | 2310 | 0.67 | 11.5 |
| Cr | bcc | 1270 | 0.36 | 18.9 |

Excellent magnetic characteristics have been demonstrated in both the coercive force Hc and the squareness ratio S when the materials having an fcc structure were used for the seed layer as compared with the case where Ta or Cr having a bcc structure was used for the seed layer. The $\Delta\theta_{50}$ values are suppressed to low values, which indicate a strong (002) plane alignment in the plane of the magnetic layer.

In Example 4, a set of magnetic recording media having the structure shown in FIG. 2 was produced by sequentially laminating a nonmagnetic alignment control layer 2 having a thickness of 5 nm using various materials, a seed layer having a thickness of 5 nm, and a nonmagnetic underlayer of a 5 nm thickness. Other conditions were the same as those in Example 1. Table 3 summarizes the material of the nonmagnetic alignment control layer, crystal structure of the nonmagnetic alignment control layer, coercive force Hc, squareness ratio S, and $\Delta\theta_{50}$ value of the thus produced set of perpendicular magnetic recording media. The $\Delta\theta_{50}$ value is a half-width of a rocking curve of the diffraction line of hcp (002) plane of the CoCrPt magnetic layer. Table 3 also shows evaluation results for a perpendicular magnetic recording medium having a nonmagnetic alignment control layer made of Cu with an fcc structure or Ru with a hcp structure, for comparison.

TABLE 3

| Material of alignment control layer | Crystal structure | Hc (Oe) | Squareness ratio (S) | $\Delta\theta_{50}$ (degree) |
|---|---|---|---|---|
| Nb | bcc | 3350 | 0.97 | 4.0 |
| Ta | bcc | 3410 | 0.98 | 4.1 |
| Mo | bcc | 3210 | 0.94 | 4.9 |
| W | bcc | 3600 | 0.98 | 3.8 |
| Ni-20% P | amorphous | 3380 | 0.99 | 4.6 |
| Cu | fcc | 2110 | 0.55 | 9.8 |
| Ru | hcp | 850 | 0.21 | 15.2 |

Excellent magnetic characteristics have been demonstrated in both the coercive force Hc and the squareness ratio S when the materials having a bcc structure or an amorphous structure were used for the nonmagnetic alignment control layer as compared with the case where the material having an fcc or hcp structure was used for the nonmagnetic alignment control layer. The $\Delta\theta_{50}$ values are suppressed to low values, which indicate a strong (002) plane alignment in the plane of the magnetic layer.

In the perpendicular magnetic recording medium according to the present invention, the nonmagnetic underlayer is composed of a metal or an alloy having a hexagonal closest-packed (hcp) crystal structure, and the seed layer is composed of a metal or an alloy having a face-centered cubic (fcc) crystal structure under the nonmagnetic underlayer. Such a perpendicular magnetic recording medium exhibits excellent magnetic characteristics even when the thickness of the underlayer is small or the total thickness of the underlayer and the seed layer is small.

By providing a nonmagnetic alignment control layer of a metal or an alloy having a body-centered cubic (bcc) structure or an amorphous structure beneath the seed layer, the crystal alignment of the seed layer can be enhanced, resulting in enhancement of the crystal alignment of the magnetic layer, as well. Employing such intermediate layers provides a perpendicular magnetic recording medium exhibiting excellent magnetic characteristics. Besides, the substrate preheating step can be omitted from a manufacturing process, which allows the use of an inexpensive plastic substrate.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-264517, in its entirety, including the drawings, claims, and the specification thereof, is incorporated herein by reference.

What is claimed is:

1. A perpendicular magnetic recording medium comprising:
    a nonmagnetic substrate; and
    at least a nonmagnetic underlayer, a first magnetic layer, a second magnetic layer, a protective layer, and a liquid lubricant layer sequentially laminated on said substrate,
    wherein said first magnetic layer comprises crystal grains of a ferromagnetic alloy containing Co and Cr, and nonmagnetic grain boundaries comprising oxide or nitride, and a thickness a of said first magnetic layer is from 10 nm to 30 nm,
    wherein said second magnetic layer comprises an amorphous alloy composed of a rare earth element and a transition metal element, and a thickness b of said second magnetic layer is from 2 nm to 15 nm, and
    wherein a ratio a/b of said thickness a to said thickness b is at least two.

2. A perpendicular magnetic recording medium according to claim 1, wherein said nonmagnetic underlayer is composed of a metal or an alloy having a hexagonal closest-packed crystal structure, said metal being one element selected from a group consisting of Ti, Re, Ru, and Os, and said alloy containing at lest one element selected from a group consisting of Ti, Re, Ru, and Os.

3. A perpendicular magnetic recording medium according to claim 1, wherein said second magnetic layer contains at least one metal element selected from a group consisting of Ni, Fe, and Co, and at least one element selected from a group consisting of Pr, Nd, Gd, Th, Dy, and Ho in a concentration in a range from 10 at % to 35 at %.

4. A perpendicular magnetic recording medium according to claim 1, wherein said nonmagnetic substrate is formed of a plastic resin.

5. A method of manufacturing a perpendicular magnetic recording medium comprising the steps of:

depositing a nonmagnetic underlayer on a nonmagnetic substrate;

depositing a first magnetic layer that comprises crystal grains of a ferromagnetic alloy containing Co—Cr, and nonmagnetic grain boundaries comprising oxide or nitride, and a thickness a of said first magnetic layer being from 10 nm to 30 nm;

depositing a second magnetic layer that comprises an amorphous alloy composed of a rare earth element and a transition metal element, and a thickness b of said second magnetic layer being from 2 nm to 15 nm;

depositing a protective film; and laminating a liquid lubricant layer, wherein a ratio a/b of said thickness a to said thickness b is at least two, and wherein each of said depositing steps is conducted while a temperature of stud substrate is lower than 80° C. or without preheating said non magnetic substrate.

6. A method of manufacturing a perpendicular magnetic recording medium according to claim 5, wherein said second magnetic layer is sputtered under an argon gas pressure in the range from 10 mTorr to 200 mTorr.

7. A perpendicular magnetic recording medium according to clam 1, wherein said nonmagnetic grain boundaries comprise oxide.

8. A method of manufacturing a perpendicular magnetic recording medium according to claim 5, wherein said nonmagnetic grain boundaries comprise oxide.

* * * * *

UNITED STATES PATENT AND TRADEMARK OFFICE
CERTIFICATE OF CORRECTION

PATENT NO. : 6,794,028 B2
DATED : September 21, 2004
INVENTOR(S) : Uwazumi et al.

It is certified that error appears in the above-identified patent and that said Letters Patent is hereby corrected as shown below:

Column 8,
Line 55, please delete "lest" and insert -- least --.
Line 61, please delete "Th" and insert -- Tb --.

Column 10,
Line 9, please delete "clam" and insert -- claim --.

Signed and Sealed this

Twenty-second Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,794,028 B2
DATED : September 21, 2004
INVENTOR(S) : Uwazumi et al.

It is certified that error appears in the above-identified patent and that said Letters Patent is hereby corrected as shown below:

Delete Title page illustrating figure, and substitute therefor, new Title page illustrating figure (attached).

Reprint Abstract, Specification and drawings (attached).

Signed and Sealed this

Thirteenth Day of December, 2005

JON W. DUDAS
*Director of the United States Patent and Trademark Office*

(12) United States Patent
Uwazumi et al.

(10) Patent No.: US 6,794,028 B2
(45) Date of Patent: Sep. 21, 2004

(54) PERPENDICULAR MAGNETIC RECORDING MEDIUM AND A METHOD OF MANUFACTURING THE SAME

(75) Inventors: Hiroyuki Uwazumi, Nagano (JP); Yasushi Sakai, Nagano (JP); Tadaaki Oikawa, Nagano (JP); Miyabi Nakamura, Nagano (JP)

(73) Assignee: Fuji Electric Co., Ltd. (JP)

(*) Notice: Subject to any disclaimer, the term of this patent is extended or adjusted under 35 U.S.C. 154(b) by 0 days.

(21) Appl. No.: 10/227,621

(22) Filed: Aug. 23, 2002

(65) Prior Publication Data

US 2003/0064249 A1 Apr. 3, 2003

(30) Foreign Application Priority Data

Aug. 31, 2001 (JP) .................................. 2001-264516

(51) Int. Cl.[7] .............................. G11B 5/66; G11B 5/70
(52) U.S. Cl. .............................. 428/336; 428/694 TM; 428/694 TS; 428/694 TP; 428/216; 428/900; 427/128; 427/131; 204/192.2
(58) Field of Search .................. 428/694 TS, 694 TM, 428/694 TP, 336, 216, 900; 427/128, 131; 204/192.2

(56) References Cited

U.S. PATENT DOCUMENTS

| | | | |
|---|---|---|---|
| 5,049,451 A | * | 9/1991 | Lal et al. ................. 428/611 |
| 5,679,473 A | | 10/1997 | Murayama et al. ....... 428/694 T |
| 5,736,262 A | * | 4/1998 | Ohkijima et al. .......... 428/611 |
| 5,815,342 A | * | 9/1998 | Akiyama et al. ......... 360/97.01 |
| 5,981,039 A | * | 11/1999 | Isono et al. ............... 428/199 |
| 6,086,974 A | | 7/2000 | Thiele et al. ............. 428/65.3 |
| 6,183,893 B1 | * | 2/2001 | Futamoto et al. ...... 428/694 TS |

(List continued on next page.)

FOREIGN PATENT DOCUMENTS

| | | | |
|---|---|---|---|
| JP | 02-227814 A | * | 9/1990 |
| JP | 02-287918 | | 11/1990 |
| JP | 8-255342 | | 10/1996 |
| JP | 2002-025031 A | * | 1/2002 |

OTHER PUBLICATIONS

US RE37,748, 6/2002, Chen et al. (withdrawn)*
JPO Abstract Translation of JP 02-227814-A (Clipped Image No. JP402227814A).*
English Translation of JP 02-227814-A (Doc. ID: PTO 02-3726).*
Derwent Abstract Translation of JP 2002-025031-A (Doc. ID: JP 2002025031 A).*
Machine Translation of JP 2002-025031-A.*

(List continued on next page.)

*Primary Examiner*—Holly Rickman
(74) *Attorney, Agent, or Firm*—Rossi & Associates

(57) ABSTRACT

A perpendicular magnetic recording medium has a granular magnetic layer and a nonmagnetic underlayer of a metal or an alloy having a hexagonal closest-packed (hcp) crystal structure. A seed layer of a metal or an alloy of a face-centered cubic (fcc) crystal structure is provided under the nonmagnetic underlayer. Such a perpendicular magnetic recording medium exhibits excellent magnetic characteristics even when the thickness of the underlayer or the total thickness of the underlayer and the seed layer is very thin. Excellent magnetic characteristics can be obtained even when of the substrate is not preheated. Accordingly, a nonmagnetic substrate, such as a plastic resin can be employed to reduce the manufacturing cost.

8 Claims, 2 Drawing Sheets

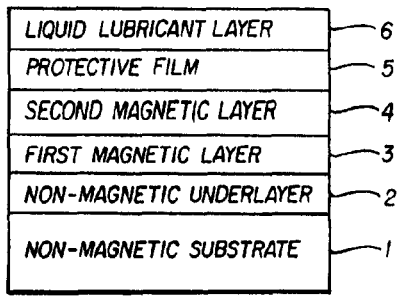

ABSTRACT OF THE DISCLOSURE

A perpendicular magnetic recording medium has a magnetic recording layer consisting of two layers. The first magnetic layer, which is a lower layer, comprises crystal grains of a ferromagnetic Co-Cr alloy system and nonmagnetic grain boundaries mainly composed of oxide or nitride, and a thickness a of the first magnetic layer is from 10 nm to 30 nm. The second magnetic layer, which is an upper layer, comprises an amorphous alloy film composed of rare earth element- transition metal alloy, and a thickness b of the second magnetic layer is from 2 nm to 15 nm. The ratio a/b of the thickness a of the first magnetic layer and the thickness b of the second magnetic layer is at least two.

PERPENDICULAR MAGNETIC RECORDING MEDIUM AND A METHOD OF MANUFACTURING THE SAME

BACKGROUND

[0001] As a technique for achieving a high density magnetic recording, a perpendicular magnetic recording has been targeted as an alternative to a conventional longitudinal magnetic recording. In a magnetic recording layer of a perpendicular magnetic recording medium, a crystalline film of CoCr alloy having a hexagonal closest packed (hcp) crystal structure principally has been contemplated. To make a perpendicular magnetic recording possible, the crystal alignment is controlled so that the c-axis of each crystal grain is perpendicular to the film surface, i.e., the c-plane parallel to the film surface. For addressing a higher recording density in a perpendicular magnetic recording medium, attempts have been made to minimize the grain size and to reduce the dispersion of the grain size of the CoCr alloy composing the magnetic recording layer, and to reduce magnetic interaction between crystal grains.

[0002] A technique has been proposed to achieve a high density recording in a longitudinal magnetic recording medium by reducing magnetic interaction between crystal grains, in which a layer of nonmagnetic and non-metallic substance, such as oxide or nitride, is formed at the grain boundary of a crystal grain composing the magnetic recording layer. This magnetic layer is called "a granular magnetic layer," and is disclosed in Japanese Unexamined Patent Application Publication Hei 8-255342 and United States Patent No. 5,679,473, for example. The magnetic grains in the granular magnetic layer are three dimensionally isolated with each other by the nonmagnetic and non-metallic grain boundary. Since magnetic interaction between the magnetic grains decreases, "zigzag domain wall" in the transition region of a recording bit is suppressed, which is considered to result in noise reduction.

[0003] On this background, the use of the granular magnetic layer has been proposed in the magnetic recording layer of a perpendicular magnetic recording medium. For example, IEEE Trans. Mag., vol. 36, p. 2393 (2000) discloses a perpendicular magnetic recording medium that comprises an underlayer of ruthenium (Ru) and a magnetic layer of a CoPtCrO alloy having a granular structure. The document shows that the c-axis alignment of crystal grains composing the magnetic layer enhances as the ruthenium underlayer becomes thicker, bringing about improvement in magnetic characteristics and electromagnetic conversion performances of the magnetic recording layer.

[0004] Studies also have been made to make a magnetic recording layer of a perpendicular magnetic recording medium by using an amorphous alloy of a rare earth element and 3d transition metal, such as a TbFeCo alloy.

[0005] A perpendicular magnetic recording layer employing the above-mentioned granular magnetic layer exhibits relatively good magnetic properties and electromagnetic conversion characteristics. For further enhancement of magnetic recording density, it is considered necessary to further minimize the grain size in the ferromagnetic layer and to further reduce magnetic interaction between crystal grains by promoting precipitation of oxides or nitrides to the grain boundary.

[0006] When the grain size in the magnetic layer is minimized and magnetic interaction between crystal grains is decreased by increasing the quantity of oxide or nitride precipitated at the grain boundary, thermal stability of information recorded on the magnetic recording layer rapidly deteriorates. In the worst case, the problem of so-called "thermal fluctuation" arises, where once recorded information disappears due to the thermal disturbance.

[0007] On the other hand, an amorphous film of a rare earth-transition metal alloy has a high perpendicular magnetic anisotropy constant Ku and is free of grain boundary because it is amorphous. Therefore, such an amorphous film has a high thermal stability for a magnetic recording layer. However, free of grain boundary also means lack of a core to hold the once recorded signal within the written place, and the recorded signal is susceptible to the phenomenon of shift or disappearance. These phenomena occur particularly in the magnetic recording at a high frequency. Therefore, such a material is unfavorable for a perpendicular magnetic recording medium for a high density magnetic recording.

[0008] Accordingly, there is a need for a perpendicular magnetic recording medium that allows a high density recording, exhibits excellent electromagnetic conversion characteristics, and provides a thermally stable performance. The present invention addresses this need.

SUMMARY OF THE INVENTION

[0009] The present invention relates to a perpendicular magnetic recording medium and a method of manufacturing the recording medium. In particular, the present invention relates to a perpendicular magnetic recording medium that can be mounted on an external memory of a computer or other magnetic recording apparatus, and to a method of manufacturing such a recording medium.

[0010] According to one aspect of the present invention, a perpendicular magnetic recording medium has a nonmagnetic substrate, and at least a nonmagnetic underlayer, a first magnetic layer, a second magnetic layer, a protective layer, and a liquid lubricant layer sequentially laminated on the substrate. The first magnetic layer has crystal grains of a ferromagnetic Co-Cr alloy system and nonmagnetic grain boundaries substantially comprising oxide or nitride. The thickness a of the first magnetic layer can be in the range of 10 nm to 30 nm. The second magnetic layer comprises an amorphous alloy composed of a rare earth element and a transition metal element. The thickness b of the second magnetic layer can be in the range of 2 nm to 15 nm. The ratio a/b of the thickness a of the first magnetic layer to the thickness b of the second magnetic layer can be at least two.

[0011] The nonmagnetic underlayer can be composed of a metal or an alloy of a hexagonal closest-packed crystal structure. The metal can be selected from Ti, Re, Ru, and Os. The alloy can contain at least one element selected from Ti, Re, Ru, and Os.

[0012] The second magnetic layer can contain at least one metal element selected from Ni, Fe, and Co, and also can contain at least one element selected from Pr, Nd, Gd, Tb, Dy, and Ho in a concentration from 10 at% to 35 at%.

[0013] The nonmagnetic substrate can be composed of a plastic resin.

[0014] According to another aspect of the present invention, a method of manufacturing a perpendicular magnetic recording medium comprises the steps of depositing and laminating at least a nonmagnetic underlayer, a first magnetic layer, a second magnetic layer, a protective layer, and a liquid lubricant layer on the nonmagnetic substrate. Each of the steps of depositing these layers are carried out while the temperature of the substrate is lower than 80°C or without preheating the nonmagnetic substrate.

[0015] The second magnetic layer can be deposited by sputtering under an argon gas pressure of 10 mTorr to 200 mTorr.

BRIEF DESCRIPTION OF THE DRAWINGS

[0016] Fig. 1 schematically illustrates a cross-sectional view of a structure of a perpendicular magnetic recording medium according to the present invention.

[0017] Fig. 2 is a graph illustrating the relationship between the D50 value and the argon gas pressure in a perpendicular magnetic recording medium according to the present invention.

DETAILED DESCRIPTION

[0018] Now, the preferred embodiments of the present invention will be described with reference to the accompanying drawings.

[0019] Referring to Fig. 1, a perpendicular magnetic recording medium according to an embodiment of the present invention includes a nonmagnetic substrate 1 and a nonmagnetic underlayer 2, a first magnetic layer 3, a second magnetic layer 4, and a protective layer 5 deposited in this order on the nonmagnetic substrate 1. On the protective layer 5, a liquid lubricant layer 6 is formed. A soft magnetic backing layer can be provided between the nonmagnetic substrate 1 and the nonmagnetic underlayer 2 to construct a so-called double-layered perpendicular magnetic recording medium, if desired. A seed layer also can be provided between the substrate 1 and the underlayer 2 to control the alignment of the crystal grains composing the underlayer 2.

[0020] The nonmagnetic substrate 1 can be formed of NiP-plated aluminum alloy, strengthened glass, or crystallized glass, which are conventionally used in a substrate of a typical magnetic recording medium. When substrate heating is unnecessary, a plastic substrate made by injection molding of a plastic resin, such as polycarbonate or polyolefin, can be used.

[0021] The protective film 5 can be a thin film composed mainly of carbon, for example. The liquid lubricant layer 6 can be composed of a perfluoropolyether lubricant, for example.

[0022] The first magnetic layer 3 is a so-called granular magnetic layer. This layer comprises crystal grains of a ferromagnetic alloy of CoCr system and nonmagnetic grain boundaries composed of nonmagnetic metal oxide or metal nitride formed between the crystal grains. The magnetic layer with such a structure can be deposited by sputtering a ferromagnetic metallic target containing the oxide or nitride that constructs the grain boundary. Alternatively, the magnetic layer can be deposited by reactive sputtering a ferromagnetic metallic target under an argon gas atmosphere containing oxygen or nitrogen.

[0023] One of the preferred materials for depositing the ferromagnetic crystalline layer is an alloy of CoCr system. To obtain excellent magnetic characteristics and recording performance, it is preferable to add at least one element selected from Pt, Ni, and Ta to the CoCr alloy. To form a stable granular structure, it is preferable to form nonmagnetic grain boundaries using an oxide of at least one element selected from the group consisting of Cr, Co, Si, Al, Ti, Ta, Hf, and Zr.

[0024] The thickness of the first magnetic layer 3 can be at least 10 nm to stabilize magnetization bits of the second magnetic layer 4. On the other hand, the thickness of the first magnetic layer can be at most 30 nm to achieve a high recording resolution by decreasing the total thickness of the magnetic recording layer, i.e., the first magnetic layer 3 and the second magnetic layer 4.

[0025] The second magnetic layer 4 can be composed of an amorphous film of a rare earth element-transition metal alloy. To achieve a high Ku value, in particular, the second magnetic layer 4 can contain at least one 3d transition metal element selected from Ni, Fe, and Co, and also can contain at least one rare earth element selected from Pr, Nd, Gd, Tb, Dy, and Ho in a concentration from 10 at% to 35 at%.

[0026] The thickness of the second magnetic layer 4 can be at least 2 nm to hold a high Ku value, and at most 15 nm to achieve a high recording density.

[0027] The process of laminating the second magnetic layer 4 can be achieved with a sputtering method. The argon gas pressure in the lamination process can be controlled in the range of 10 mTorr to 200 mTorr, more preferably in the range from 20 mTorr to 150 mTorr to improve the recording performance in a high density recording condition.

[0028] Besides these conditions, the ratio a/b of the thickness a of the first magnetic layer to the thickness b of the second magnetic layer can be at least two to stabilize magnetization bits of the second magnetic layer 4. If the first magnetic layer 3 is relatively too thin and the second magnetic layer 4 is relatively too thick, the magnetic energy of the second magnetic layer 4 becomes dominant, and therefore, the contribution of the first magnetic layer 3 to the magnetization behavior of the whole magnetic layer consisting of the first and the second magnetic layers relatively diminishes, reducing the effect that would be brought about by the double-layer structure of the magnetic layer.

[0029] The nonmagnetic underlayer 2 can be formed using a material that appropriately controls crystal orientation, grain size, and grain boundary segregation of impurities in the first magnetic layer 3. To appropriately control the alignment of the crystal orientation in the first magnetic layer, in particular, the underlayer can be composed of a metal with a hcp crystal structure selected from Ti, Re, Ru, and Os, or an alloy containing at least one metal selected from Ti, Re, Ru, and Os.

[0030] Although the thickness of the nonmagnetic underlayer 2 need not be limited to a specific range, a minimum thickness for controlling the crystal structure of the first magnetic layer 3 is desirable in order to enhance the recording resolution in the case of a double-layered perpendicular magnetic recording medium and to increase the productivity of the perpendicular magnetic recording medium.

[0031] A perpendicular magnetic recording medium having above-described structure exhibits an excellent magnetic performance even if the process of heating the substrate is omitted. The substrate heating process has been requisite for manufacturing a conventional magnetic recording medium. The present invention thus simplifies the manufacturing process and reduces the manufacturing cost. Because substrate heating is unnecessary, a nonmagnetic substrate of a plastic resin, such as polycarbonate or polyolefin can be employed according to the present invention.

[0032] Some specific examples of preferred embodiments of the present invention will be described below. The examples are merely intended to illustrate the spirit of the present invention, not to limit the scope of the present invention.

[0033] In Example 1, the nonmagnetic substrate is a polycarbonate substrate of 3.5" disk made by injection molding. The substrate was cleaned and mounted on a substrate holder of a sputtering device. Without preheating the substrate before the deposition processes, a nonmagnetic underlayer composed of ruthenium (Ru) of 50 nm thickness was deposited to the nonmagnetic substrate by sputtering under an argon gas pressure of 5 mTorr.

[0034] Subsequently, a first magnetic layer having a thickness in the range from 5 to 40 nm was deposited by a RF sputtering method using a target of $Co_{76}Cr_{12}Pt_{12}$ with the addition of 10 mol% $SiO_2$ under an argon gas pressure of 5 mTorr. Then, a second magnetic layer having a thickness in the range from 1 to 20 nm was deposited by a RF sputtering method using a target of $Tb_{20}Co_{80}$ under an argon gas pressure of 50 mTorr.

[0035] After depositing a carbon protective layer having thickness of 10 nm by a RF sputtering method, the resulting substrate was taken out from the sputtering device. A liquid lubricant was coated to a thickness of 1.5 nm on the carbon protective layer. Thus, a perpendicular magnetic recording medium having the structure shown in Fig. 1 was produced.

[0036] Table 1 summarizes the characteristics of the thus laminated set of perpendicular magnetic recording media. This table includes the thickness a of the first magnetic layer, the thickness b of the second magnetic layer, the ratio a/b of the thickness a of the first magnetic layer and the thickness b of the second magnetic layer, the indicator D50 of the maximum magnetic recording density, which is defined by a recording density at which the output is a half of the output of an isolated pulse waveform, and an output signal ratio as an index of thermal stability, which is defined by a ratio of a regenerative output at 1000 seconds after writing to a regenerative output immediately after writing.

[0037] The D50 and the output signal ratio were measured using a spinning stand tester and a GMR head with a writing track width 1 μm, a gap length 0.25 μm, a regenerative track width 0.7 μm, and a shield gap length of 0.12 μm. The head flying height was about 20 nm.

[0038] As is apparent from Table 1, both high density magnetic recording and excellent thermal stability have been achieved in the perpendicular magnetic recording media in which the thickness of the first magnetic layer is from 10 to 30 nm, the thickness of the second magnetic layer is from 2 to 15 nm, and the ratio a/b of the first magnetic layer thickness a to the second magnetic layer thickness b is two or larger.

| TABLE 1 | | | | |
|---|---|---|---|---|
| Thickness (a) of first magnetic layer (nm) | Thickness (b) of second magnetic layer (nm) | (a/b) | D50 (kFCI) | Regeneration output ratio (%) |
| 5 | 2 | 2.5 | 83 | 65 |
| 5 | 5 | 1 | 52 | 90 |
| 10 | 1 | 10 | 160 | 62 |
| 10 | 2 | 5 | 213 | 95 |
| 10 | 5 | 2 | 244 | 98 |
| 10 | 10 | 1 | 66 | 99 |
| 20 | 1 | 20 | 173 | 73 |
| 20 | 2 | 10 | 222 | 97 |
| 20 | 5 | 4 | 266 | 99 |
| 20 | 10 | 2 | 270 | 100 |
| 20 | 15 | 1.3 | 54 | 99 |
| 20 | 20 | 1 | 32 | 100 |
| 30 | 2 | 15 | 198 | 97 |
| 30 | 5 | 6 | 219 | 99 |
| 30 | 10 | 3 | 248 | 100 |
| 30 | 15 | 2 | 210 | 98 |
| 40 | 2 | 20 | 181 | 96 |
| 40 | 10 | 4 | 170 | 98 |
| 40 | 20 | 2 | 147 | 97 |

[0039] In Example 2, a set of perpendicular magnetic recording media having the structure as shown in Fig. 1 was produced using various materials for the second magnetic layer. The thickness of the first magnetic layer was maintained at 20 nm, while the thickness of the second magnetic layer was maintained at 5 nm. The conditions of the lamination process were the same as those in Example 1 except for the material of the second magnetic layer. Table 2 summarizes the materials for laminating the second magnetic layer and the coercive force Hc of thus laminated perpendicular magnetic recording media. The coercive force Hc was measured using a vibrating sample magnetometer applying a magnetic field perpendicular to the film surface.

[0040] As the results in Table 2 show, it is preferable to laminate the second magnetic layer using a material that contains at least one 3d transition metal selected from Ni, Fe, and Co, and also at least one rare earth element selected from Pr, Nd, Gd, Tb, Dy, and Ho in a concentration from 10 at% to 35 at%.

| TABLE 2 | |
|---|---|
| Material of second magnetic layer | Hc (Oe) |
| Co-20%Ce | <100 |
| Co-20%Pr | 5100 |
| Co-20%Nd | 4280 |
| Co-20%Pm | <100 |
| Co-20%Sm | <100 |
| Co-20%Eu | <100 |
| Co-20%Gd | 3090 |
| Co-5%Tb | 620 |
| Co-20%Tb | 8230 |
| Co-30%Tb | 6550 |
| Co-40%Tb | 810 |
| Co-10%Fe-15%Tb | 7240 |
| Co-20%Dy | 6970 |
| Co-20%Ho | 3510 |
| Co-20%Er | <100 |
| Co-20%Tm | <100 |

[0041] In Example 3, a set of perpendicular magnetic recording media having the structure as shown in Fig. 1 was produced by laminating the second magnetic layer under various argon gas pressures. The thickness of the first magnetic layer was maintained at 20 nm, while the thickness of the second magnetic layer was maintained at 10 nm. The conditions of the production process were the same as those in Example 1 except for the argon gas pressure in the step of laminating the second magnetic layer.

[0042] Fig.2 is a graph showing the relation between D50 of the thus produced perpendicular magnetic recording media and the argon gas pressure in the lamination process. As the results of Fig. 2 show, it is preferable to control argon gas pressure in the range from 10 mTorr to 200 mTorr, more preferably from 20 mTorr to 150 mTorr, for enhancement of recording performance in a high density recording.

[0043] In Example 4, a set of perpendicular magnetic recording media having the structure as shown in Fig. 1 was produced by laminating the nonmagnetic underlayer having a thickness of 50 nm using various materials. The first magnetic layer having a thickness of 20 nm and the second magnetic layer having a thickness of 10 nm were deposited on the nonmagnetic underlayer. The conditions of the production process were the same as those in Example 1 except for the materials of the nonmagnetic underlayer.

[0044] Table 3 shows the results of evaluating crystallinity of the first magnetic layer of thus produced perpendicular magnetic recording media by means of an X-ray diffraction method. The value $\Delta\theta_{50}$ is a half-width of a rocking curve of hcp (002) diffraction line obtained with the first magnetic layer. The values of nonmagnetic underlayers of Ta and Cr having a body-centered cubic (bcc) structure are also shown for comparison. Table 3 shows that $\Delta\theta_{50}$ values in the cases employing a nonmagnetic underlayer made of the various materials having the hcp structure are suppressed small as compared with $\Delta\theta_{50}$ values in the cases employing a nonmagnetic underlayer made of Ta and Cr having the bcc structure. The X-ray diffraction peak has become sharp as a result of enhancement of c-axis alignment of the crystal grains composing the first magnetic layer.

| TABLE 3 | | |
|---|---|---|
| material of nonmagnetic underlayer | crystal structure of underlayer | $\Delta\theta_{50}$ (degree) |
| Ru | hcp | 5.6 |
| Re | hcp | 5.2 |
| Os | hcp | 6.1 |
| Ti | hcp | 7.9 |
| Ru-20%W | hcp | 5.0 |
| Ti-10%Cr | hcp | 7.2 |
| Ta | bcc | 25.0 |
| Cr | bcc | 19.3 |

[0045] In the perpendicular magnetic recording medium according to the present invention, the magnetic layer consists of two layers. The first magnetic layer, which is a lower layer, comprises crystal grains of a ferromagnetic alloy of CoCr system and nonmagnetic grain boundaries of mainly oxide or nitride. The second magnetic layer, which is an upper layer, comprises an amorphous film of a rare earth-transition metal alloy. The thickness of the first magnetic layer is in the range from 10 nm to 30 nm, and thickness of the second magnetic layer is in the range of 2 nm to 15 nm. In addition, the ratio a/b of the first magnetic layer thickness a to the second magnetic layer thickness b is at least two. A perpendicular magnetic recording medium having such structure has been demonstrated to exhibit a favorable electromagnetic conversion characteristic under a high recording density condition and excellent thermal stability.

[0046] Alignment of the first magnetic layer can be favorably controlled by making the nonmagnetic underlayer using a metal selected from Ti, Re, Ru, and Os having hcp crystal structure, or an alloy containing at least an element selected from Ti, Re, Ru, and Os.

[0047] A high Ku value is obtained and thermal stability is improved by making the second magnetic layer to contain at least a 3d transition metal selected from Ni, Fe, and Co, and also at least a rare earth element selected from Pr, Nd, Gd, Tb, Dy, and Ho in a concentration of from 10 at% to 35 at%.

[0048] The recording performance in a high density recording is improved by controlling the argon gas pressure in the step of depositing the second magnetic layer in the range from 10 mTorr to 200 mTorr, more preferably from 20 mTorr to 150 mTorr.

[0049] Since satisfactory performance can be achieved by manufacturing a perpendicular magnetic recording medium having the above-described structure under the above-described conditions, preheating becomes unnecessary, leading to a simplified manufacturing process and thus reducing the production cost. At the same time, an inexpensive plastic substrate can be employed.

[0050] Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

[0051] The disclosure of the priority application, JP PA 2001-264516, in its entirety, including the drawings, claims, and the specification thereof, is incorporated herein by reference.

UNITED STATES PATENT AND TRADEMARK OFFICE
CERTIFICATE OF CORRECTION

PATENT NO. : 6,794,028 B2
DATED : September 21, 2004
INVENTOR(S) : Uwazumi et al.

It is certified that error appears in the above-identified patent and that said Letters Patent is hereby corrected as shown below:

Reprint entire patent, Title page, Drawings, Specification and Claims.

Signed and Sealed this

Seventh Day of February, 2006

JON W. DUDAS
*Director of the United States Patent and Trademark Office*

(12) United States Patent
Uwazumi et al.

(10) Patent No.: US 6,794,028 B2
(45) Date of Patent: Sep. 21, 2004

(54) PERPENDICULAR MAGNETIC RECORDING MEDIUM AND A METHOD OF MANUFACTURING THE SAME

(75) Inventors: Hiroyuki Uwazumi, Nagano (JP); Yasushi Sakai, Nagano (JP); Tadaaki Oikawa, Nagano (JP); Miyabi Nakamura, Nagano (JP)

(73) Assignee: Fuji Electric Co., Ltd. (JP)

(*) Notice: Subject to any disclaimer, the term of this patent is extended or adjusted under 35 U.S.C. 154(b) by 0 days.

(21) Appl. No.: 10/227,621

(22) Filed: Aug. 23, 2002

(65) Prior Publication Data

US 2003/0064249 A1 Apr. 3, 2003

(30) Foreign Application Priority Data

Aug. 31, 2001 (JP) ................................. 2001-264516

(51) Int. Cl.$^7$ ................................................ G11B 5/66
(52) U.S. Cl. ................. 428/336; 428/694 TM; 428/694 TS; 428/694 TP; 428/216; 428/900; 427/128; 427/131; 204/192.2
(58) Field of Search ................. 428/694 TS, 694 TM, 428/694 TP, 336, 216, 900; 427/128, 131; 204/192.2

(56) References Cited

U.S. PATENT DOCUMENTS

| 5,049,451 A | 9/1991 | Lal et al. ................. 428/611 |
| 5,679,473 A | 10/1997 | Murayama et al. ....... 428/694 T |
| 5,736,262 A | 4/1998 | Ohkijima et al. ........... 428/611 |
| 5,815,342 A | 9/1998 | Akiyama et al. ......... 360/97.01 |
| 5,981,039 A | 11/1999 | Isono et al. ................. 428/199 |
| 6,086,974 A | 7/2000 | Thiele et al. .............. 428/65.3 |
| 6,183,893 B1 | 2/2001 | Futamoto et al. ...... 428/694 TS |
| 6,248,416 B1 | 6/2001 | Lambeth et al. .......... 428/65.3 |
| 6,416,839 B1 | 7/2002 | Xuan et al. ................ 428/65.4 |
| 6,447,936 B1 | 9/2002 | Futamoto et al. ..... 428/694 TM |
| 6,524,724 B1 | 2/2003 | Cheng et al. ................ 428/611 |
| 6,589,669 B2 | 7/2003 | Uwazumi et al. ........... 428/611 |
| 2002/0018917 A1 | 2/2002 | Sakai et al. ........... 428/694 TM |
| 2002/0058159 A1 | 5/2002 | Kubota et al. ........ 428/694 TM |
| 2003/0049495 A1 | 3/2003 | Sakai et al. ........... 428/694 TM |
| 2003/0064249 A1 | 4/2003 | Uwazumi et al. ..... 428/694 BA |

FOREIGN PATENT DOCUMENTS

| JP | 02-227814 A | 9/1990 |
| JP | 02-287918 | 11/1990 |
| JP | 8-255342 | 10/1996 |
| JP | 2002/025031 A | 1/2002 |

OTHER PUBLICATIONS

JPO Abstract Translation of JP 02-227814-A.
English Translation of JP 02-227814-A.
Derwent Abstract translation of JP 2002-025031-A.
Machine Translation of JP 2002-025031-A.
"High Performance CoPtCrO Single Layered Perpendicular Media with No Recording Demagnetization", Oikawa et al.:IEEE TRansactions on Magnetics, vol. 36, No. 5; Sep. 2000; pp. 2393–2395.
U.S. Appl. No. 10/227,622, filed Aug. 2002, Uwazumi et al.

*Primary Examiner*—Holly Rickman
(74) *Attorney, Agent, or Firm*—Rossi & Associates

(57) ABSTRACT

A perpendicular magnetic recording medium has a magnetic recording layer consisting of two layers. The first magnetic layer, which is a lower layer, comprises crystal grains of a ferromagnetic Co—Cr alloy system and nonmagnetic grain boundaries mainly composed of oxide or nitride, and a thickness a of the first magnetic layer is from 10 nm to 30 nm. The second magnetic layer, which is an upper layer, comprises an amorphous alloy film composed of rare earth element—transition metal alloy, and a thickness b of the second magnetic layer is from 2 nm to 15 nm. The ratio a/b of the thickness a of the first magnetic layer and the thickness b of the second magnetic layer is at least two.

6 Claims, 1 Drawing Sheet

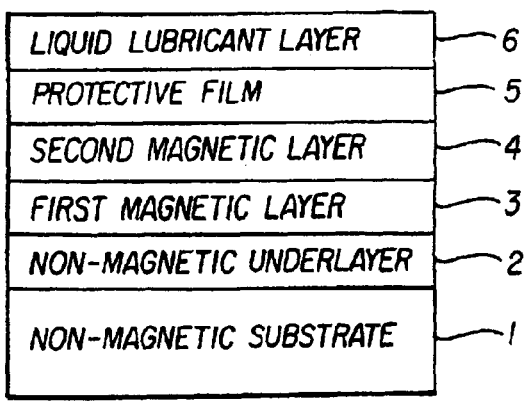

PERPENDICULAR MAGNETIC RECORDING MEDIUM AND A METHOD OF MANUFACTURING THE SAME

BACKGROUND

As a technique for achieving a high density magnetic recording, a perpendicular magnetic recording has been targeted as an alternative to a conventional longitudinal magnetic recording. In a magnetic recording layer of a perpendicular magnetic recording medium, a crystalline film of CoCr alloy having a hexagonal closest packed (hcp) crystal structure principally has been contemplated. To make a perpendicular magnetic recording possible, the crystal alignment is controlled so that the c-axis of each crystal grain is perpendicular to the film surface, i.e., the c-plane parallel to the film surface. For addressing a higher recording density in a perpendicular magnetic recording medium, attempts have been made to minimize the grain size and to reduce the dispersion of the grain size of the CoCr alloy composing the magnetic recording layer, and to reduce magnetic interaction between crystal grains.

A technique has been proposed to achieve a high density recording in a longitudinal magnetic recording medium by reducing magnetic interaction between crystal grains, in which a layer of nonmagnetic and non-metallic substance, such as oxide or nitride, is formed at the grain boundary of a crystal grain composing the magnetic recording layer. This magnetic layer is called "a granular magnetic layer," and is disclosed in Japanese Unexamined Patent Application Publication Hei 8-255342 and U.S. Pat. No. 5,679,473, for example. The magnetic grains in the granular magnetic layer are three dimensionally isolated with each other by the nonmagnetic and non-metallic grain boundary. Since magnetic interaction between the magnetic grains decreases, "zigzag domain wall" in the transition region of a recording bit is suppressed, which is considered to result in noise reduction.

On this background, the use of the granular magnetic layer has been proposed in the magnetic recording layer of a perpendicular magnetic recording medium. For example, IEEE Trans. Mag., vol. 36, p. 2393 (2000) discloses a perpendicular magnetic recording medium that comprises an underlayer of ruthenium (Ru) and a magnetic layer of a CoPtCrO alloy having a granular structure. The document shows that the c-axis alignment of crystal grains composing the magnetic layer enhances as the ruthenium underlayer becomes thicker, bringing about improvement in magnetic characteristics and electromagnetic conversion performances of the magnetic recording layer.

Studies also have been made to make a magnetic recording layer of a perpendicular magnetic recording medium by using an amorphous alloy of a rare earth element and $3d$ transition metal, such as a TbFeCo alloy.

A perpendicular magnetic recording layer employing the above-mentioned granular magnetic layer exhibits relatively good magnetic properties and electromagnetic conversion characteristics. For further enhancement of magnetic recording density, it is considered necessary to further minimize the grain size in the ferromagnetic layer and to further reduce magnetic interaction between crystal grains by promoting precipitation of oxides or nitrides to the grain boundary.

When the grain size in the magnetic layer is minimized and magnetic interaction between crystal grains is decreased by increasing the quantity of oxide or nitride precipitated at the grain boundary, thermal stability of information recorded on the magnetic recording layer rapidly deteriorates. In the worst case, the problem of so-called "thermal fluctuation" arises, where once recorded information disappears due to the thermal disturbance.

On the other hand, an amorphous film of a rare earth-transition metal alloy has a high perpendicular magnetic anisotropy constant Ku and is free of grain boundary because it is amorphous. Therefore, such an amorphous film has a high thermal stability for a magnetic recording layer. However, free of grain boundary also means lack of a core to hold the once recorded signal within the written place, and the recorded signal is susceptible to the phenomenon of shift or disappearance. These phenomena occur particularly in the magnetic recording at a high frequency. Therefore, such a material is unfavorable for a perpendicular magnetic recording medium for a high density magnetic recording.

Accordingly, there is a need for a perpendicular magnetic recording medium that allows a high density recording, exhibits excellent electromagnetic conversion characteristics, and provides a thermally stable performance. The present invention addresses this need.

SUMMARY OF THE INVENTION

The present invention relates to a perpendicular magnetic recording medium and a method of manufacturing the recording medium. In particular, the present invention relates to a perpendicular magnetic recording medium that can be mounted on an external memory of a computer or other magnetic recording apparatus, and to a method of manufacturing such a recording medium.

According to one aspect of the present invention, a perpendicular magnetic recording medium has a nonmagnetic substrate, and at least a nonmagnetic underlayer, a first magnetic layer, a second magnetic layer, a protective layer, and a liquid lubricant layer sequentially laminated on the substrate. The first magnetic layer has crystal grains of a ferromagnetic Co—Cr alloy system and nonmagnetic grain boundaries substantially comprising oxide or nitride. The thickness a of the first magnetic layer can be in the range of 10 nm to 30 nm. The second magnetic layer comprises an amorphous alloy composed of a rare earth element and a transition metal element. The thickness b of the second magnetic layer can be in the range of 2 nm to 15 nm. The ratio a/b of the thickness a of the first magnetic layer to the thickness b of the second magnetic layer can be at least two.

The nonmagnetic underlayer can be composed of a metal or an alloy of a hexagonal closest-packed crystal structure. The metal can be selected from Ti, Re, Ru, and Os. The alloy can contain at least one element selected from Ti, Re, Ru, and Os.

The second magnetic layer can contain at least one metal element selected from Ni, Fe, and Co, and also can contain at least one element selected from Pr, Nd, Gd, Tb, Dy, and Ho in a concentration from 10 at % to 35 at %.

The nonmagnetic substrate can be composed of a plastic resin.

According to another aspect of the present invention, a method of manufacturing a perpendicular magnetic recording medium comprises the steps of depositing and laminating at least a nonmagnetic underlayer, a first magnetic layer, a second magnetic layer, a protective layer, and a liquid lubricant layer on the nonmagnetic substrate. Each of the steps of depositing these layers are carried out while the temperature of the substrate is lower than 80° C. or without preheating the nonmagnetic substrate.

Subsequently, a first magnetic layer having a thickness in the range from 5 to 40 nm was deposited by a RF sputtering method using a target of $Co_{76}Cr_{12}Pt_{12}$ with the addition of 10 mol % $SiO_2$ under an argon gas pressure of 5 mTorr. Then, a second magnetic layer having a thickness in the range from 1 to 20 nm was deposited by a RF sputtering method using a target of $Tb_{20}Co_{80}$ under an argon gas pressure of 50 mTorr.

After depositing a carbon protective layer having thickness of 10 nm by a RF sputtering method, the resulting substrate was taken out from the sputtering device. A liquid lubricant was coated to a thickness of 1.5 nm on the carbon protective layer. Thus, a perpendicular magnetic recording medium having the structure shown in FIG. 1 was produced.

Table 1 summarizes the characteristics of the thus laminated set of perpendicular magnetic recording media. This table includes the thickness a of the first magnetic layer, the thickness b of the second magnetic layer, the ratio a/b of the thickness a of the first magnetic layer and the thickness b of the second magnetic layer, the indicator D50 of the maximum magnetic recording density, which is defined by a recording density at which the output is a half of the output of an isolated pulse waveform, and an output signal ratio as an index of thermal stability, which is defined by a ratio of a regenerative output at 1000 seconds after writing to a regenerative output immediately after writing.

The D50 and the output signal ratio were measured using a spinning stand tester and a GMR head with a writing track width 1 μm, a gap length 0.25 μm, a regenerative track width 0.7 μm, and a shield gap length of 0.12 μm. The head flying height was about 20 nm.

As is apparent from Table 1, both high density magnetic recording and excellent thermal stability have been achieved in the perpendicular magnetic recording media in which the thickness of the first magnetic layer is from 10 to 30 nm, the thickness of the second magnetic layer is from 2 to 15 nm, and the ratio a/b of the first magnetic layer thickness a to the second magnetic layer thickness b is two or larger.

TABLE 1

| Thickness (a) of first magnetic layer (nm) | Thickness (b) of second magnetic layer (nm) | (a/b) | D50 (kFCI) | Regeneration output ratio (%) |
|---|---|---|---|---|
| 5 | 2 | 2.5 | 83 | 65 |
| 5 | 5 | 1 | 52 | 90 |
| 10 | 1 | 10 | 160 | 62 |
| 10 | 2 | 5 | 213 | 95 |
| 10 | 5 | 2 | 244 | 98 |
| 10 | 10 | 1 | 66 | 99 |
| 20 | 1 | 20 | 173 | 73 |
| 20 | 2 | 10 | 222 | 97 |
| 20 | 5 | 4 | 266 | 99 |
| 20 | 10 | 2 | 270 | 100 |
| 20 | 15 | 1.3 | 54 | 99 |
| 20 | 20 | 1 | 32 | 100 |
| 30 | 2 | 15 | 198 | 97 |
| 30 | 5 | 6 | 219 | 99 |
| 30 | 10 | 3 | 248 | 100 |
| 30 | 15 | 2 | 210 | 98 |
| 40 | 2 | 20 | 181 | 96 |
| 40 | 10 | 4 | 170 | 98 |
| 40 | 20 | 2 | 147 | 97 |

In Example 2, a set of perpendicular magnetic recording media having the structure as shown in FIG. 1 was produced using various materials for the second magnetic layer. The thickness of the first magnetic layer was maintained at 20 nm, while the thickness of the second magnetic layer was maintained at 5 nm. The conditions of the lamination process were the same as those in Example 1 except for the material of the second magnetic layer. Table 2 summarizes the materials for laminating the second magnetic layer and the coercive force Hc of thus laminated perpendicular magnetic recording media. The coercive force Hc was measured using a vibrating sample magnetometer applying a magnetic field perpendicular to the film surface.

As the results in Table 2 show, it is preferable to laminate the second magnetic layer using a material that contains at least one 3d transition metal selected from Ni, Fe, and Co, and also at least one rare earth element selected from Pr, Nd, Gd, Tb, Dy, and Ho in a concentration from 10 at % to 35 at %.

TABLE 2

| Material of second magnetic layer | Hc (Oe) |
|---|---|
| Co-20%Ce | <100 |
| Co-20%Pr | 5100 |
| Co-20%Nd | 4280 |
| Co-20%Pm | <100 |
| Co-20%Sm | <100 |
| Co-20%Eu | <100 |
| Co-20%Gd | 3090 |
| Co-5%Tb | 620 |
| Co-20%Tb | 8230 |
| Co-30%Tb | 6550 |
| Co-40%Tb | 810 |
| Co-10%Fe-15%Tb | 7240 |
| Co-20%Dy | 6970 |
| Co-20%Ho | 3510 |
| Co-20%Er | <100 |
| Co-20%Tm | <100 |

In Example 3, a set of perpendicular magnetic recording media having the structure as shown in FIG. 1 was produced by laminating the second magnetic layer under various argon gas pressures. The thickness of the first magnetic layer was maintained at 20 nm, while the thickness of the second magnetic layer was maintained at 10 nm. The conditions of the production process were the same as those in Example 1 except for the argon gas pressure in the step of laminating the second magnetic layer.

FIG. 2 is a graph showing the relation between D50 of the thus produced perpendicular magnetic recording media and the argon gas pressure in the lamination process. As the results of FIG. 2 show, it is preferable to control argon gas pressure in the range from 10 mTorr to 200 mTorr, more preferably from 20 mTorr to 150 mTorr, for enhancement of recording performance in a high density recording.

In Example 4, a set of perpendicular magnetic recording media having the structure as shown in FIG. 1 was produced by laminating the nonmagnetic underlayer having a thickness of 50 nm using various materials. The first magnetic layer having a thickness of 20 nm and the second magnetic layer having a thickness of 10 nm were deposited on the nonmagnetic underlayer. The conditions of the production process were the same as those in Example 1 except for the materials of the nonmagnetic underlayer.

Table 3 shows the results of evaluating crystallinity of the first magnetic layer of thus produced perpendicular magnetic recording media by means of an X-ray diffraction method. The value $\Delta\theta_{50}$ is a half-width of a rocking curve of hcp (002) diffraction line obtained with the first magnetic layer. The values of nonmagnetic underlayers of Ta and Cr having a body-centered cubic (bcc) structure are also shown for comparison. Table 3 shows that $\Delta\theta_{50}$ values in the cases employing a nonmagnetic underlayer made of the various materials having the hcp structure are suppressed small as compared with $\Delta\theta_{50}$ values in the cases employing a nonmagnetic underlayer made of Ta and Cr having the bcc structure. The X-ray diffraction peak has become sharp as a result of enhancement of c-axis alignment of the crystal grains composing the first magnetic layer.

TABLE 3

| material of nonmagnetic underlayer | crystal structure of underlayer | $\Delta\theta_{50}$ (degree) |
|---|---|---|
| Ru | hcp | 5.6 |
| Re | hcp | 5.2 |
| Os | hcp | 6.1 |
| Ti | hcp | 7.9 |
| Ru-20%W | hcp | 5.0 |
| Ti-10%Cr | hcp | 7.2 |
| Ta | bcc | 25.0 |
| Cr | bcc | 19.3 |

In the perpendicular magnetic recording medium according to the present invention, the magnetic layer consists of two layers. The first magnetic layer, which is a lower layer, comprises crystal grains of a ferromagnetic alloy of CoCr system and nonmagnetic grain boundaries of mainly oxide or nitride. The second magnetic layer, which is an upper layer, comprises an amorphous film of a rare earth-transition metal alloy. The thickness of the first magnetic layer is in the range from 10 nm to 30 nm, and thickness of the second magnetic layer is in the range of 2 nm to 15 nm. In addition, the ratio a/b of the first magnetic layer thickness a to the second magnetic layer thickness b is at least two. A perpendicular magnetic recording medium having such structure has been demonstrated to exhibit a favorable electromagnetic conversion characteristic under a high recording density condition and excellent thermal stability.

Alignment of the first magnetic layer can be favorably controlled by making the nonmagnetic underlayer using a metal selected from Ti, Re, Ru, and Os having hcp crystal structure, or an alloy containing at least an element selected from Ti, Re, Ru, and Os.

A high Ku value is obtained and thermal stability is improved by making the second magnetic layer to contain at least a 3d transition metal selected from Ni, Fe, and Co, and also at least a rare earth element selected from Pr, Nd, Gd, Tb, Dy, and Ho in a concentration of from 10 at % to 35 at %.

The recording performance in a high density recording is improved by controlling the argon gas pressure in the step of depositing the second magnetic layer in the range from 10 mTorr to 200 mTorr, more preferably from 20 mTorr to 150 mTorr.

Since satisfactory performance can be achieved by manufacturing a perpendicular magnetic recording medium having the above-described structure under the above-described conditions, preheating becomes unnecessary, leading to a simplified manufacturing process and thus reducing the production cost. At the same time, an inexpensive plastic substrate can be employed.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-264516, in its entirety, including the drawings, claims, and the specification thereof, is incorporated herein by reference.

What is claimed is:

1. A perpendicular magnetic recording medium comprising:

a nonmagnetic substrate; and at least a nonmagnetic underlayer, a first magnetic layer, a second magnetic layer, a protective layer, and a liquid lubricant layer sequentially laminated on said substrate, wherein said first magnetic layer comprises crystal grains of a ferromagnetic Co—Cr alloy system and nonmagnetic grain boundaries mainly composed of oxide or nitride, and a thickness a of said first magnetic layer is from 10 nm to 30 nm, wherein said second magnetic layer comprises an amorphous alloy composed of a rare earth element and a transition metal element, and a thickness b of said second magnetic layer is from 2 nm to 15 nm, and wherein a ratio a/b of said thickness a to said thickness b is at least two.

2. A perpendicular magnetic recording medium according to claim 1, wherein said nonmagnetic underlayer is composed of a metal or an alloy having a hexagonal closest-packed crystal structure, said metal being one element selected from a group consisting of Ti, Re, Ru, and Os, and said alloy containing at least one element selected from a group consisting of Ti, Re, Ru, and Os.

3. A perpendicular magnetic recording medium according to claim 1, wherein said second magnetic layer contains at least one metal element selected from a group consisting of Ni, Fe, and Co, and at least one element selected from a group consisting of Pr, Nd, Gd, Tb, Dy, and Ho in a concentration in a range from 10 at % to 35 at %.

4. A perpendicular magnetic recording medium according to claim 1, wherein said nonmagnetic substrate is formed of a plastic resin.

5. A method of manufacturing a perpendicular magnetic recording medium comprising the steps of:

depositing a nonmagnetic underlayer on a nonmagnetic substrate;

depositing a first magnetic layer that comprises crystal grains of a ferromagnetic Co—Cr alloy system and nonmagnetic grain boundaries mainly composed of oxide or nitride, and a thickness a of said first magnetic layer being from 10 nm to 30 nm;

depositing a second magnetic layer that comprises an amorphous alloy composed of a rare earth element and a transition metal element, and a thickness b of said second magnetic layer being from 2 nm to 15 nm;

depositing a protective film; and laminating a liquid lubricant layer, wherein a ratio a/b of said thickness a to said thickness b is at least two, and wherein each of said depositing steps is conducted while a temperature of said substrate is lower than 80° C. or without preheating said non magnetic substrate.

6. A method of manufacturing a perpendicular magnetic recording medium according to claim 5, wherein said second magnetic layer is sputtered under an argon gas pressure in the range from 10 mTorr to 200 mTorr.

* * * * *

UNITED STATES PATENT AND TRADEMARK OFFICE
CERTIFICATE OF CORRECTION

PATENT NO. : 6,794,028 B2 Page 1 of 7
DATED : September 21, 2004
INVENTOR(S) : Uwazumi et al.

It is certified that error appears in the above-identified patent and that said Letters Patent is hereby corrected as shown below:

Reprint entire patent as shown on attached pages.

Signed and Sealed this

Sixteenth Day of May, 2006

JON W. DUDAS
*Director of the United States Patent and Trademark Office*

(12) United States Patent
Uwazumi et al.

(10) Patent No.: US 6,794,028 B2
(45) Date of Patent: Sep. 21, 2004

(54) PERPENDICULAR MAGNETIC RECORDING MEDIUM AND A METHOD OF MANUFACTURING THE SAME

(75) Inventors: Hiroyuki Uwazumi, Nagano (JP); Yasushi Sakai, Nagano (JP); Tadaaki Oikawa, Nagano (JP); Miyabi Nakamura, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/227,621

(22) Filed: Aug. 23, 2002

(65) Prior Publication Data

US 2003/0064249 A1 Apr. 3, 2003

(30) Foreign Application Priority Data

Aug. 31, 2001 (JP) .................................. 2001-264516

(51) Int. Cl.$^7$ ................................................ G11B 5/66
(52) U.S. Cl. ................. 428/336; 428/694 TM; 428/694 TS; 428/694 TP; 428/216; 428/900; 427/128; 427/131; 204/192.2
(58) Field of Search .................... 428/694 TS, 694 TM, 428/694 TP, 336, 216, 900; 427/128, 131; 204/192.2

(56) References Cited

U.S. PATENT DOCUMENTS

| | | |
|---|---|---|
| 5,049,451 A | 9/1991 | Lal et al. .................... 428/611 |
| 5,679,473 A | 10/1997 | Murayama et al. ....... 428/694 T |
| 5,736,262 A | 4/1998 | Ohkijima et al. .......... 428/611 |
| 5,815,342 A | 9/1998 | Akiyama et al. ......... 360/97.01 |
| 5,981,039 A | 11/1999 | Isono et al. ................ 428/199 |
| 6,086,974 A | 7/2000 | Thiele et al. .............. 428/65.3 |
| 6,183,893 B1 | 2/2001 | Futamoto et al. ...... 428/694 TS |
| 6,248,416 B1 | 6/2001 | Lambeth et al. ........... 428/65.3 |
| 6,416,839 B1 | 7/2002 | Xuan et al. ................ 428/65.4 |
| 6,447,936 B1 | 9/2002 | Futamoto et al. ..... 428/694 TM |
| 6,524,724 B1 | 2/2003 | Cheng et al. ............... 428/611 |
| 6,589,669 B2 | 7/2003 | Uwazumi et al. .......... 428/611 |
| 2002/0018917 A1 | 2/2002 | Sakai et al. .......... 428/694 TM |
| 2002/0058159 A1 | 5/2002 | Kubota et al. ........ 428/694 TM |
| 2003/0049495 A1 | 3/2003 | Sakai et al. .......... 428/694 TM |
| 2003/0064249 A1 | 4/2003 | Uwazumi et al. ..... 428/694 BA |

FOREIGN PATENT DOCUMENTS

| | | |
|---|---|---|
| JP | 02-227814 A | 9/1990 |
| JP | 02-287918 | 11/1990 |
| JP | 8-255342 | 10/1996 |
| JP | 2002/025031 A | 1/2002 |

OTHER PUBLICATIONS

JPO Abstract Translation of JP 02–227814–A.
English Translation of JP 02–227814–A.
Derwent Abstract translation of JP 2002–025031–A.
Machine Translation of JP 2002–025031–A.
"High Performance CoPtCrO Single Layered Perpendicular Media with No Recording Demagnetization", Oikawa et al.:IEEE TRansactions on Magnetics, vol. 36, No. 5; Sep. 2000; pp. 2393–2395.
U.S. Appl. No. 10/227,622, filed Aug. 2002, Uwazumi et al.

*Primary Examiner*—Holly Rickman
(74) *Attorney, Agent, or Firm*—Rossi & Associates

(57) ABSTRACT

A perpendicular magnetic recording medium has a magnetic recording layer consisting of two layers. The first magnetic layer, which is a lower layer, comprises crystal grains of a ferromagnetic Co—Cr alloy system and nonmagnetic grain boundaries mainly composed of oxide or nitride, and a thickness a of the first magnetic layer is from 10 nm to 30 nm. The second magnetic layer, which is an upper layer, comprises an amorphous alloy film composed of rare earth element—transition metal alloy, and a thickness b of the second magnetic layer is from 2 nm to 15 nm. The ratio a/b of the thickness a of the first magnetic layer and the thickness b of the second magnetic layer is at least two.

6 Claims, 1 Drawing Sheet

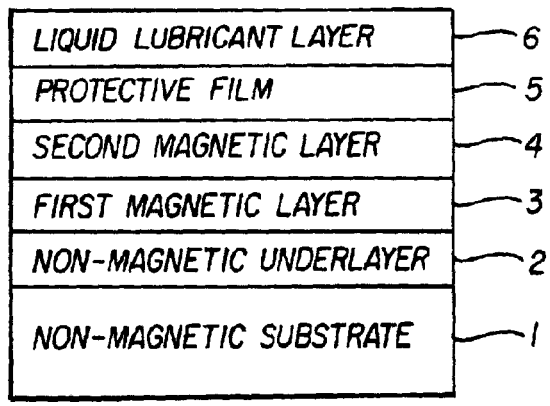

PERPENDICULAR MAGNETIC RECORDING MEDIUM AND A METHOD OF MANUFACTURING THE SAME

BACKGROUND

As a technique for achieving a high density magnetic recording, a perpendicular magnetic recording has been targeted as an alternative to a conventional longitudinal magnetic recording. In a magnetic recording layer of a perpendicular magnetic recording medium, a crystalline film of CoCr alloy having a hexagonal closest packed (hcp) crystal structure principally has been contemplated. To make a perpendicular magnetic recording possible, the crystal alignment is controlled so that the c-axis of each crystal grain is perpendicular to the film surface, i.e., the c-plane parallel to the film surface. For addressing a higher recording density in a perpendicular magnetic recording medium, attempts have been made to minimize the grain size and to reduce the dispersion of the grain size of the CoCr alloy composing the magnetic recording layer, and to reduce magnetic interaction between crystal grains.

A technique has been proposed to achieve a high density recording in a longitudinal magnetic recording medium by reducing magnetic interaction between crystal grains, in which a layer of nonmagnetic and non-metallic substance, such as oxide or nitride, is formed at the grain boundary of a crystal grain composing the magnetic recording layer. This magnetic layer is called "a granular magnetic layer," and is disclosed in Japanese Unexamined Patent Application Publication Hei 8-255342 and U.S. Pat. No. 5,679,473, for example. The magnetic grains in the granular magnetic layer are three dimensionally isolated with each other by the nonmagnetic and non-metallic grain boundary. Since magnetic interaction between the magnetic grains decreases, "zigzag domain wall" in the transition region of a recording bit is suppressed, which is considered to result in noise reduction.

On this background, the use of the granular magnetic layer has been proposed in the magnetic recording layer of a perpendicular magnetic recording medium. For example, IEEE Trans. Mag., vol. 36, p. 2393 (2000) discloses a perpendicular magnetic recording medium that comprises an underlayer of ruthenium (Ru) and a magnetic layer of a CoPtCrO alloy having a granular structure. The document shows that the c-axis alignment of crystal grains composing the magnetic layer enhances as the ruthenium underlayer becomes thicker, bringing about improvement in magnetic characteristics and electromagnetic conversion performances of the magnetic recording layer.

Studies also have been made to make a magnetic recording layer of a perpendicular magnetic recording medium by using an amorphous alloy of a rare earth element and 3d transition metal, such as a TbFeCo alloy.

A perpendicular magnetic recording layer employing the above-mentioned granular magnetic layer exhibits relatively good magnetic properties and electromagnetic conversion characteristics. For further enhancement of magnetic recording density, it is considered necessary to further minimize the grain size in the ferromagnetic layer and to further reduce magnetic interaction between crystal grains by promoting precipitation of oxides or nitrides to the grain boundary.

When the grain size in the magnetic layer is minimized and magnetic interaction between crystal grains is decreased by increasing the quantity of oxide or nitride precipitated at the grain boundary, thermal stability of information recorded on the magnetic recording layer rapidly deteriorates. In the worst case, the problem of so-called "thermal fluctuation" arises, where once recorded information disappears due to the thermal disturbance.

On the other hand, an amorphous film of a rare earth-transition metal alloy has a high perpendicular magnetic anisotropy constant Ku and is free of grain boundary because it is amorphous. Therefore, such an amorphous film has a high thermal stability for a magnetic recording layer. However, free of grain boundary also means lack of a core to hold the once recorded signal within the written place, and the recorded signal is susceptible to the phenomenon of shift or disappearance. These phenomena occur particularly in the magnetic recording at a high frequency. Therefore, such a material is unfavorable for a perpendicular magnetic recording medium for a high density magnetic recording.

Accordingly, there is a need for a perpendicular magnetic recording medium that allows a high density recording, exhibits excellent electromagnetic conversion characteristics, and provides a thermally stable performance. The present invention addresses this need.

SUMMARY OF THE INVENTION

The present invention relates to a perpendicular magnetic recording medium and a method of manufacturing the recording medium. In particular, the present invention relates to a perpendicular magnetic recording medium that can be mounted on an external memory of a computer or other magnetic recording apparatus, and to a method of manufacturing such a recording medium.

According to one aspect of the present invention, a perpendicular magnetic recording medium has a nonmagnetic substrate, and at least a nonmagnetic underlayer, a first magnetic layer, a second magnetic layer, a protective layer, and a liquid lubricant layer sequentially laminated on the substrate. The first magnetic layer has crystal grains of a ferromagnetic Co—Cr alloy system and nonmagnetic grain boundaries substantially comprising oxide or nitride. The thickness a of the first magnetic layer can be in the range of 10 nm to 30 nm. The second magnetic layer comprises an amorphous alloy composed of a rare earth element and a transition metal element. The thickness b of the second magnetic layer can be in the range of 2 nm to 15 nm. The ratio a/b of the thickness a of the first magnetic layer to the thickness b of the second magnetic layer can be at least two.

The nonmagnetic underlayer can be composed of a metal or an alloy of a hexagonal closest-packed crystal structure. The metal can be selected from Ti, Re, Ru, and Os. The alloy can contain at least one element selected from Ti, Re, Ru, and Os.

The second magnetic layer can contain at least one metal element selected from Ni, Fe, and Co, and also can contain at least one element selected from Pr, Nd, Gd, Tb, Dy, and Ho in a concentration from 10 at % to 35 at %.

The nonmagnetic substrate can be composed of a plastic resin.

According to another aspect of the present invention, a method of manufacturing a perpendicular magnetic recording medium comprises the steps of depositing and laminating at least a nonmagnetic underlayer, a first magnetic layer, a second magnetic layer, a protective layer, and a liquid lubricant layer on the nonmagnetic substrate. Each of the steps of depositing these layers are carried out while the temperature of the substrate is lower than 80° C. or without preheating the nonmagnetic substrate.

The second magnetic layer can be deposited by sputtering under an argon gas pressure of 10 mTorr to 200 mTorr.

BRIEF DESCRIPTION OF THE DRAWINGS

FIG. 1 schematically illustrates a cross-sectional view of a structure of a perpendicular magnetic recording medium according to the present invention.

FIG. 2 is a graph illustrating the relationship between the D50 value and the argon gas pressure in a perpendicular magnetic recording medium according to the present invention.

DETAILED DESCRIPTION

Now, the preferred embodiments of the present invention will be described with reference to the accompanying drawings.

Referring to FIG. 1, a perpendicular magnetic recording medium according to an embodiment of the present invention includes a nonmagnetic substrate 1 and a nonmagnetic underlayer 2, a first magnetic layer 3, a second magnetic layer 4, and a protective layer 5 deposited in this order on the nonmagnetic substrate 1. On the protective layer 5, a liquid lubricant layer 6 is formed. A soft magnetic backing layer can be provided between the nonmagnetic substrate 1 and the nonmagnetic underlayer 2 to construct a so-called double-layered perpendicular magnetic recording medium, if desired. A seed layer also can be provided between the substrate 1 and the underlayer 2 to control the alignment of the crystal grains composing the underlayer 2.

The nonmagnetic substrate 1 can be formed of NiP-plated aluminum alloy, strengthened glass, or crystallized glass, which are conventionally used in a substrate of a typical magnetic recording medium. When substrate heating is unnecessary, a plastic substrate made by injection molding of a plastic resin, such as polycarbonate or polyolefin, can be used.

The protective film 5 can be a thin film composed mainly of carbon, for example. The liquid lubricant layer 6 can be composed of a perfluoropolyether lubricant, for example.

The first magnetic layer 3 is a so-called granular magnetic layer. This layer comprises crystal grains of a ferromagnetic alloy of CoCr system and nonmagnetic grain boundaries composed of nonmagnetic metal oxide or metal nitride formed between the crystal grains. The magnetic layer with such a structure can be deposited by sputtering a ferromagnetic metallic target containing the oxide or nitride that constructs the grain boundary. Alternatively, the magnetic layer can be deposited by reactive sputtering a ferromagnetic metallic target under an argon gas atmosphere containing oxygen or nitrogen.

One of the preferred materials for depositing the ferromagnetic crystalline layer is an alloy of CoCr system. To obtain excellent magnetic characteristics and recording performance, it is preferable to add at least one element selected from Pt, Ni, and Ta to the CoCr alloy. To form a stable granular structure, it is preferable to form nonmagnetic grain boundaries using an oxide of at least one element selected from the group consisting of Cr, Co, Si, Al, Ti, Ta, Hf, and Zr.

The thickness of the first magnetic layer 3 can be at least 10 nm to stabilize magnetization bits of the second magnetic layer 4. On the other hand, the thickness of the first magnetic layer can be at most 30 nm to achieve a high recording resolution by decreasing the total thickness of the magnetic recording layer, i.e., the first magnetic layer 3 and the second magnetic layer 4.

The second magnetic layer 4 can be composed of an amorphous film of a rare earth element-transition metal alloy. To achieve a high Ku value, in particular, the second magnetic layer 4 can contain at least one 3d transition metal element selected from Ni, Fe, and Co, and also can contain at least one rare earth element selected from Pr, Nd, Gd, Tb, Dy, and Ho in a concentration from 10 at % to 35 at %.

The thickness of the second magnetic layer 4 can be at least 2 nm to hold a high Ku value, and at most 15 nm to achieve a high recording density.

The process of laminating the second magnetic layer 4 can be achieved with a sputtering method. The argon gas pressure in the lamination process can be controlled in the range of 10 mTorr to 200 mTorr, more preferably in the range from 20 mTorr to 150 mTorr to improve the recording performance in a high density recording condition.

Besides these conditions, the ratio a/b of the thickness a of the first magnetic layer to the thickness b of the second magnetic layer can be at least two to stabilize magnetization bits of the second magnetic layer 4. If the first magnetic layer 3 is relatively too thin and the second magnetic layer 4 is relatively too thick, the magnetic energy of the second magnetic layer 4 becomes dominant, and therefore, the contribution of the first magnetic layer 3 to the magnetization behavior of the whole magnetic layer consisting of the first and the second magnetic layers relatively diminishes, reducing the effect that would be brought about by the double-layer structure of the magnetic layer.

The nonmagnetic underlayer 2 can be formed using a material that appropriately controls crystal orientation, grain size, and grain boundary segregation of impurities in the first magnetic layer 3. To appropriately control the alignment of the crystal orientation in the first magnetic layer, in particular, the underlayer can be composed of a metal with a hcp crystal structure selected from Ti, Re, Ru, and Os, or an alloy containing at least one metal selected from Ti, Re, Ru, and Os.

Although the thickness of the nonmagnetic underlayer 2 need not be limited to a specific range, a minimum thickness for controlling the crystal structure of the first magnetic layer 3 is desirable in order to enhance the recording resolution in the case of a double-layered perpendicular magnetic recording medium and to increase the productivity of the perpendicular magnetic recording medium.

A perpendicular magnetic recording medium having above-described structure exhibits an excellent magnetic performance even if the process of heating the substrate is omitted. The substrate heating process has been requisite for manufacturing a conventional magnetic recording medium. The present invention thus simplifies the manufacturing process and reduces the manufacturing cost. Because substrate heating is unnecessary, a nonmagnetic substrate of a plastic resin, such as polycarbonate or polyolefin can be employed according to the present invention.

Some specific examples of preferred embodiments of the present invention will be described below. The examples are merely intended to illustrate the spirit of the present invention, not to limit the scope of the present invention.

In Example 1, the nonmagnetic substrate is a polycarbonate substrate of 3.5" disk made by injection molding. The substrate was cleaned and mounted on a substrate holder of a sputtering device. Without preheating the substrate before the deposition processes, a nonmagnetic underlayer composed of ruthenium (Ru) of 50 nm thickness was deposited to the nonmagnetic substrate by sputtering under an argon gas pressure of 5 mTorr.

Subsequently, a first magnetic layer having a thickness in the range from 5 to 40 nm was deposited by a RF sputtering method using a target of $Co_{76}Cr_{12}Pt_{12}$ with the addition of 10 mol % $SiO_2$ under an argon gas pressure of 5 mTorr. Then, a second magnetic layer having a thickness in the range from 1 to 20 nm was deposited by a RF sputtering method using a target of $Tb_{20}Co_{80}$ under an argon gas pressure of 50 mTorr.

After depositing a carbon protective layer having thickness of 10 nm by a RF sputtering method, the resulting substrate was taken out from the sputtering device. A liquid lubricant was coated to a thickness of 1.5 nm on the carbon protective layer. Thus, a perpendicular magnetic recording medium having the structure shown in FIG. 1 was produced.

Table 1 summarizes the characteristics of the thus laminated set of perpendicular magnetic recording media. This table includes the thickness a of the first magnetic layer, the thickness b of the second magnetic layer, the ratio a/b of the thickness a of the first magnetic layer and the thickness b of the second magnetic layer, the indicator D50 of the maximum magnetic recording density, which is defined by a recording density at which the output is a half of the output of an isolated pulse waveform, and an output signal ratio as an index of thermal stability, which is defined by a ratio of a regenerative output at 1000 seconds after writing to a regenerative output immediately after writing.

The D50 and the output signal ratio were measured using a spinning stand tester and a GMR head with a writing track width 1 μm, a gap length 0.25 μm, a regenerative track width 0.7 μm, and a shield gap length of 0.12 μm. The head flying height was about 20 nm.

As is apparent from Table 1, both high density magnetic recording and excellent thermal stability have been achieved in the perpendicular magnetic recording media in which the thickness of the first magnetic layer is from 10 to 30 nm, the thickness of the second magnetic layer is from 2 to 15 nm, and the ratio a/b of the first magnetic layer thickness a to the second magnetic layer thickness b is two or larger.

TABLE 1

| Thickness (a) of first magnetic layer (nm) | Thickness (b) of second magnetic layer (nm) | (a/b) | D50 (kFCI) | Regeneration output ratio (%) |
|---|---|---|---|---|
| 5 | 2 | 2.5 | 83 | 65 |
| 5 | 5 | 1 | 52 | 90 |
| 10 | 1 | 10 | 160 | 62 |
| 10 | 2 | 5 | 213 | 95 |
| 10 | 5 | 2 | 244 | 98 |
| 10 | 10 | 1 | 66 | 99 |
| 20 | 1 | 20 | 173 | 73 |
| 20 | 2 | 10 | 222 | 97 |
| 20 | 5 | 4 | 266 | 99 |
| 20 | 10 | 2 | 270 | 100 |
| 20 | 15 | 1.3 | 54 | 99 |
| 20 | 20 | 1 | 32 | 100 |
| 30 | 2 | 15 | 198 | 97 |
| 30 | 5 | 6 | 219 | 99 |
| 30 | 10 | 3 | 248 | 100 |
| 30 | 15 | 2 | 210 | 98 |
| 40 | 2 | 20 | 181 | 96 |
| 40 | 10 | 4 | 170 | 98 |
| 40 | 20 | 2 | 147 | 97 |

In Example 2, a set of perpendicular magnetic recording media having the structure as shown in FIG. 1 was produced using various materials for the second magnetic layer. The thickness of the first magnetic layer was maintained at 20 nm, while the thickness of the second magnetic layer was maintained at 5 nm. The conditions of the lamination process were the same as those in Example 1 except for the material of the second magnetic layer. Table 2 summarizes the materials for laminating the second magnetic layer and the coercive force Hc of thus laminated perpendicular magnetic recording media. The coercive force Hc was measured using a vibrating sample magnetometer applying a magnetic field perpendicular to the film surface.

As the results in Table 2 show, it is preferable to laminate the second magnetic layer using a material that contains at least one 3d transition metal selected from Ni, Fe, and Co, and also at least one rare earth element selected from Pr, Nd, Gd, Tb, Dy, and Ho in a concentration from 10 at % to 35 at %.

TABLE 2

| Material of second magnetic layer | Hc (Oe) |
|---|---|
| Co-20%Ce | <100 |
| Co-20%Pr | 5100 |
| Co-20%Nd | 4280 |
| Co-20%Pm | <100 |
| Co-20%Sm | <100 |
| Co-20%Eu | <100 |
| Co-20%Gd | 3090 |
| Co-5%Tb | 620 |
| Co-20%Tb | 8230 |
| Co-30%Tb | 6550 |
| Co-40%Tb | 810 |
| Co-10%Fe-15%Tb | 7240 |
| Co-20%Dy | 6970 |
| Co-20%Ho | 3510 |
| Co-20%Er | <100 |
| Co-20%Tm | <100 |

In Example 3, a set of perpendicular magnetic recording media having the structure as shown in FIG. 1 was produced by laminating the second magnetic layer under various argon gas pressures. The thickness of the first magnetic layer was maintained at 20 nm, while the thickness of the second magnetic layer was maintained at 10 nm. The conditions of the production process were the same as those in Example 1 except for the argon gas pressure in the step of laminating the second magnetic layer.

FIG. 2 is a graph showing the relation between D50 of the thus produced perpendicular magnetic recording media and the argon gas pressure in the lamination process. As the results of FIG. 2 show, it is preferable to control argon gas pressure in the range from 10 mTorr to 200 mTorr, more preferably from 20 mTorr to 150 mTorr, for enhancement of recording performance in a high density recording.

In Example 4, a set of perpendicular magnetic recording media having the structure as shown in FIG. 1 was produced by laminating the nonmagnetic underlayer having a thickness of 50 nm using various materials. The first magnetic layer having a thickness of 20 nm and the second magnetic layer having a thickness of 10 nm were deposited on the nonmagnetic underlayer. The conditions of the production process were the same as those in Example 1 except for the materials of the nonmagnetic underlayer.

Table 3 shows the results of evaluating crystallinity of the first magnetic layer of thus produced perpendicular magnetic recording media by means of an X-ray diffraction method. The value $\Delta\theta_{50}$ is a half-width of a rocking curve of hcp (002) diffraction line obtained with the first magnetic layer. The values of nonmagnetic underlayers of Ta and Cr having a body-centered cubic (bcc) structure are also shown for comparison. Table 3 shows that $\Delta\theta_{50}$ values in the cases employing a nonmagnetic underlayer made of the various materials having the hcp structure are suppressed small as compared with Δθ₅₀ values in the cases employing a nonmagnetic underlayer made of Ta and Cr having the bcc structure. The X-ray diffraction peak has become sharp as a result of enhancement of c-axis alignment of the crystal grains composing the first magnetic layer.

TABLE 3

| material of nonmagnetic underlayer | crystal structure of underlayer | $\Delta\theta_{50}$ (degree) |
|---|---|---|
| Ru | hcp | 5.6 |
| Re | hcp | 5.2 |
| Os | hcp | 6.1 |
| Ti | hcp | 7.9 |
| Ru-20%W | hcp | 5.0 |
| Ti-10%Cr | hcp | 7.2 |
| Ta | bcc | 25.0 |
| Cr | bcc | 19.3 |

In the perpendicular magnetic recording medium according to the present invention, the magnetic layer consists of two layers. The first magnetic layer, which is a lower layer, comprises crystal grains of a ferromagnetic alloy of CoCr system and nonmagnetic grain boundaries of mainly oxide or nitride. The second magnetic layer, which is an upper layer, comprises an amorphous film of a rare earth-transition metal alloy. The thickness of the first magnetic layer is in the range from 10 nm to 30 nm, and thickness of the second magnetic layer is in the range of 2 nm to 15 nm. In addition, the ratio a/b of the first magnetic layer thickness a to the second magnetic layer thickness b is at least two. A perpendicular magnetic recording medium having such structure has been demonstrated to exhibit a favorable electromagnetic conversion characteristic under a high recording density condition and excellent thermal stability.

Alignment of the first magnetic layer can be favorably controlled by making the nonmagnetic underlayer using a metal selected from Ti, Re, Ru, and Os having hcp crystal structure, or an alloy containing at least an element selected from Ti, Re, Ru, and Os.

A high Ku value is obtained and thermal stability is improved by making the second magnetic layer to contain at least a 3d transition metal selected from Ni, Fe, and Co, and also at least a rare earth element selected from Pr, Nd, Gd, Tb, Dy, and Ho in a concentration of from 10 at % to 35 at %.

The recording performance in a high density recording is improved by controlling the argon gas pressure in the step of depositing the second magnetic layer in the range from 10 mTorr to 200 mTorr, more preferably from 20 mTorr to 150 mTorr.

Since satisfactory performance can be achieved by manufacturing a perpendicular magnetic recording medium having the above-described structure under the above-described conditions, preheating becomes unnecessary, leading to a simplified manufacturing process and thus reducing the production cost. At the same time, an inexpensive plastic substrate can be employed.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-264516, in its entirety, including the drawings, claims, and the specification thereof, is incorporated herein by reference.

What is claimed is:

1. A perpendicular magnetic recording medium comprising:

a nonmagnetic substrate; and at least a nonmagnetic underlayer, a first magnetic layer, a second magnetic layer, a protective layer, and a liquid lubricant layer sequentially laminated on said substrate, wherein said first magnetic layer comprises crystal grains of a ferromagnetic Co—Cr alloy system and nonmagnetic grain boundaries mainly composed of oxide or nitride, and a thickness a of said first magnetic layer is from 10 nm to 30 nm, wherein said second magnetic layer comprises an amorphous alloy composed of a rare earth element and a transition metal element, and a thickness b of said second magnetic layer is from 2 nm to 15 nm, and wherein a ratio a/b of said thickness a to said thickness b is at least two.

2. A perpendicular magnetic recording medium according to claim 1, wherein said nonmagnetic underlayer is composed of a metal or an alloy having a hexagonal closest-packed crystal structure, said metal being one element selected from a group consisting of Ti, Re, Ru, and Os, and said alloy containing at least one element selected from a group consisting of Ti, Re, Ru, and Os.

3. A perpendicular magnetic recording medium according to claim 1, wherein said second magnetic layer contains at least one metal element selected from a group consisting of Ni, Fe, and Co, and at least one element selected from a group consisting of Pr, Nd, Gd, Tb, Dy, and Ho in a concentration in a range from 10 at % to 35 at %.

4. A perpendicular magnetic recording medium according to claim 1, wherein said nonmagnetic substrate is formed of a plastic resin.

5. A method of manufacturing a perpendicular magnetic recording medium comprising the steps of::

depositing a nonmagnetic underlayer on a nonmagnetic substrate;

depositing a first magnetic layer that comprises crystal grains of a ferromagnetic Co—Cr alloy system and nonmagnetic grain boundaries mainly composed of oxide or nitride, and a thickness a of said first magnetic layer being from 10 nm to 30 nm;

depositing a second magnetic layer that comprises an amorphous alloy composed of a rare earth element and a transition metal element, and a thickness b of said second magnetic layer being from 2 nm to 15 nm;

depositing a protective film; and laminating a liquid lubricant layer, wherein a ratio a/b of said thickness a to said thickness b is at least two, and wherein each of said depositing steps is conducted while a temperature of said substrate is lower than 80° C. or without preheating said non magnetic substrate.

6. A method of manufacturing a perpendicular magnetic recording medium according to claim 5, wherein said second magnetic layer is sputtered under an argon gas pressure in the range from 10 mTorr to 200 mTorr.

* * * * *

UNITED STATES PATENT AND TRADEMARK OFFICE
CERTIFICATE OF CORRECTION

PATENT NO. : 6,794,028 B2
DATED : September 21, 2004
INVENTOR(S) : Uwazumi et al.

It is certified that error appears in the above-identified patent and that said Letters Patent is hereby corrected as shown below:

Reprint entire patent as shown on attached pages.

This certificate supersedes Certificate of Correction issued March 22, 2005, December 13, 2005, February 7, 2006 and May 16, 2006.

Signed and Sealed this

Thirteenth Day of June, 2006

JON W. DUDAS
*Director of the United States Patent and Trademark Office*

(12) United States Patent
Uwazumi et al.

(10) Patent No.: US 6,794,028 B2
(45) Date of Patent: Sep. 21, 2004

(54) PERPENDICULAR MAGNETIC RECORDING MEDIUM AND A METHOD OF MANUFACTURING THE SAME

(75) Inventors: Hiroyuki Uwazumi, Nagano (JP); Yasushi Sakai, Nagano (JP); Tadaaki Oikawa, Nagano (JP); Miyabi Nakamura, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/227,621

(22) Filed: Aug. 23, 2002

(65) Prior Publication Data

US 2003/0064249 A1 Apr. 3, 2003

(30) Foreign Application Priority Data

Aug. 31, 2001 (JP) ..................................... 2001-264516

(51) Int. Cl.$^7$ ................................................. G11B 5/66
(52) U.S. Cl. ............................. 428/336; 428/694 TM; 428/694 TS; 428/694 TP; 428/216; 428/900; 427/128; 427/131; 204/192.2
(58) Field of Search .................... 428/694 TS, 694 TM, 428/694 TP, 336, 216, 900; 427/128, 131; 204/192.2

(56) References Cited

U.S. PATENT DOCUMENTS

| | | | | |
|---|---|---|---|---|
| 5,049,451 A | * | 9/1991 | Lal et al. ................ | 428/611 |
| 5,679,473 A | | 10/1997 | Murayama et al. ...... | 428/694 T |
| 5,736,262 A | * | 4/1998 | Ohkijima et al. .......... | 428/611 |
| 5,815,342 A | * | 9/1998 | Akiyama et al. ......... | 360/97.01 |
| 5,981,039 A | * | 11/1999 | Isono et al. .............. | 428/199 |
| 6,086,974 A | | 7/2000 | Thiele et al. ............. | 428/65.3 |
| 6,183,893 B1 | * | 2/2001 | Futamoto et al. ...... | 428/694 TS |
| 6,248,416 B1 | | 6/2001 | Lambeth et al. .......... | 428/65.3 |
| 6,416,839 B1 | * | 7/2002 | Xuan et al. ............. | 428/65.4 |
| 6,447,936 B1 | * | 9/2002 | Futamoto et al. ..... | 428/694 TM |
| 6,524,724 B1 | * | 2/2003 | Cheng et al. ............. | 428/611 |
| 6,589,669 B2 | | 7/2003 | Uwazumi et al. .......... | 428/611 |
| 2002/0018917 A1 | * | 2/2002 | Sakai et al. .......... | 428/694 TM |
| 2002/0058159 A1 | * | 5/2002 | Kubota et al. ........ | 428/694 TM |
| 2003/0049495 A1 | | 3/2003 | Sakai et al. .......... | 428/694 TM |
| 2003/0064249 A1 | * | 4/2003 | Uwazumi et al. ..... | 428/694 BA |

FOREIGN PATENT DOCUMENTS

| | | | |
|---|---|---|---|
| JP | 02-227814 A | * | 9/1990 |
| JP | 02-287918 | | 11/1990 |
| JP | 8-255342 | | 10/1996 |
| JP | 2002/025031 A | * | 1/2002 |

OTHER PUBLICATIONS

US RE37,748, 6/2002, Chen et al. (withdrawn)*
JPO Abstract Translation of JP 02–227814–A.*
English Translation of JP 02–227814–A.*
Derwent Abstract translation of JP 2002–025031–A.*
Machine Translation of JP 2002–025031–A.*
"High Performance CoPtCrO Single Layered Perpendicular Media with No Recording Demagnetization", Oikawa et al.:IEEE TRansactions on Magnetics, vol. 36, No. 5; Sep. 2000; pp. 2393–2395.
U.S. Appl. No. 10/227,622, filed Aug. 2002, Uwazumi et al.

* cited by examiner

Primary Examiner—Holly Rickman
(74) Attorney, Agent, or Firm—Rossi & Associates

(57) ABSTRACT

A perpendicular magnetic recording medium has a magnetic recording layer consisting of two layers. The first magnetic layer, which is a lower layer, comprises crystal grains of a ferromagnetic Co—Cr alloy system and nonmagnetic grain boundaries mainly composed of oxide or nitride, and a thickness a of the first magnetic layer is from 10 nm to 30 nm. The second magnetic layer, which is an upper layer, comprises an amorphous alloy film composed of rare earth element—transition metal alloy, and a thickness b of the second magnetic layer is from 2 nm to 15 nm. The ratio a/b of the thickness a of the first magnetic layer and the thickness b of the second magnetic layer is at least two.

8 Claims, 1 Drawing Sheet

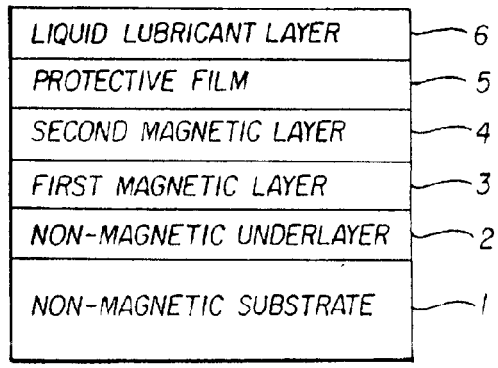

PERPENDICULAR MAGNETIC RECORDING MEDIUM AND A METHOD OF MANUFACTURING THE SAME

BACKGROUND

As a technique for achieving a high density magnetic recording, a perpendicular magnetic recording has been targeted as an alternative to a conventional longitudinal magnetic recording. In a magnetic recording layer of a perpendicular magnetic recording medium, a crystalline film of CoCr alloy having a hexagonal closest packed (hcp) crystal structure principally has been contemplated. To make a perpendicular magnetic recording possible, the crystal alignment is controlled so that the c-axis of each crystal grain is perpendicular to the film surface, i.e., the c-plane parallel to the film surface. For addressing a higher recording density in a perpendicular magnetic recording medium, attempts have been made to minimize the grain size and to reduce the dispersion of the grain size of the CoCr alloy composing the magnetic recording layer, and to reduce magnetic interaction between crystal grains.

A technique has been proposed to achieve a high density recording in a longitudinal magnetic recording medium by reducing magnetic interaction between crystal grains, in which a layer of nonmagnetic and non-metallic substance, such as oxide or nitride, is formed at the grain boundary of a crystal grain composing the magnetic recording layer. This magnetic layer is called "a granular magnetic layer," and is disclosed in Japanese Unexamined Patent Application Publication Hei 8-255342 and U.S. Pat. No. 5,679,473, for example. The magnetic grains in the granular magnetic layer are three dimensionally isolated with each other by the nonmagnetic and non-metallic grain boundary. Since magnetic interaction between the magnetic grains decreases, "zigzag domain wall" in the transition region of a recording bit is suppressed, which is considered to result in noise reduction.

On this background, the use of the granular magnetic layer has been proposed in the magnetic recording layer of a perpendicular magnetic recording medium. For example, IEEE Trans. Mag., vol. 36, p. 2393 (2000) discloses a perpendicular magnetic recording medium that comprises an underlayer of ruthenium (Ru) and a magnetic layer of a CoPtCrO alloy having a granular structure. The document shows that the c-axis alignment of crystal grains composing the magnetic layer enhances as the ruthenium underlayer becomes thicker, bringing about improvement in magnetic characteristics and electromagnetic conversion performances of the magnetic recording layer.

Studies also have been made to make a magnetic recording layer of a perpendicular magnetic recording medium by using an amorphous alloy of a rare earth element and $3d$ transition metal, such as a TbFeCo alloy.

A perpendicular magnetic recording layer employing the above-mentioned granular magnetic layer exhibits relatively good magnetic properties and electromagnetic conversion characteristics. For further enhancement of magnetic recording density, it is considered necessary to further minimize the grain size in the ferromagnetic layer and to further reduce magnetic interaction between crystal grains by promoting precipitation of oxides or nitrides to the grain boundary.

When the grain size in the magnetic layer is minimized and magnetic interaction between crystal grains is decreased by increasing the quantity of oxide or nitride precipitated at the grain boundary, thermal stability of information recorded on the magnetic recording layer rapidly deteriorates. In the worst case, the problem of so-called "thermal fluctuation" arises, where once recorded information disappears due to the thermal disturbance.

On the other hand, an amorphous film of a rare earth-transition metal alloy has a high perpendicular magnetic anisotropy constant Ku and is free of grain boundary because it is amorphous. Therefore, such an amorphous film has a high thermal stability for a magnetic recording layer. However, free of grain boundary also means lack of a core to hold the once recorded signal within the written place, and the recorded signal is susceptible to the phenomenon of shift or disappearance. These phenomena occur particularly in the magnetic recording at a high frequency. Therefore, such a material is unfavorable for a perpendicular magnetic recording medium for a high density magnetic recording.

Accordingly, there is a need for a perpendicular magnetic recording medium that allows a high density recording, exhibits excellent electromagnetic conversion characteristics, and provides a thermally stable performance. The present invention addresses this need.

SUMMARY OF THE INVENTION

The present invention relates to a perpendicular magnetic recording medium and a method of manufacturing the recording medium. In particular, the present invention relates to a perpendicular magnetic recording medium that can be mounted on an external memory of a computer or other magnetic recording apparatus, and to a method of manufacturing such a recording medium.

According to one aspect of the present invention, a perpendicular magnetic recording medium has a nonmagnetic substrate, and at least a nonmagnetic underlayer, a first magnetic layer, a second magnetic layer, a protective layer, and a liquid lubricant layer sequentially laminated on the substrate. The first magnetic layer has crystal grains of a ferromagnetic Co—Cr alloy system and nonmagnetic grain boundaries substantially comprising oxide or nitride. The thickness a of the first magnetic layer can be in the range of 10 nm to 30 nm. The second magnetic layer comprises an amorphous alloy composed of a rare earth element and a transition metal element. The thickness b of the second magnetic layer can be in the range of 2 nm to 15 nm. The ratio a/b of the thickness a of the first magnetic layer to the thickness b of the second magnetic layer can be at least two.

The nonmagnetic underlayer can be composed of a metal or an alloy of a hexagonal closest-packed crystal structure. The metal can be selected from Ti, Re, Ru, and Os. The alloy can contain at least one element selected from Ti, Re, Ru, and Os.

The second magnetic layer can contain at least one metal element selected from Ni, Fe, and Co, and also can contain at least one element selected from Pr, Nd, Gd, Tb, Dy, and Ho in a concentration from 10 at % to 35 at %.

The nonmagnetic substrate can be composed of a plastic resin.

According to another aspect of the present invention, a method of manufacturing a perpendicular magnetic recording medium comprises the steps of depositing and laminating at least a nonmagnetic underlayer, a first magnetic layer, a second magnetic layer, a protective layer, and a liquid lubricant layer on the nonmagnetic substrate. Each of the steps of depositing these layers are carried out while the temperature of the substrate is lower than 80° C. or without preheating the nonmagnetic substrate.

The second magnetic layer can be deposited by sputtering under an argon gas pressure of 10 mTorr to 200 mTorr.

BRIEF DESCRIPTION OF THE DRAWINGS

FIG. 1 schematically illustrates a cross-sectional view of a structure of a perpendicular magnetic recording medium according to the present invention.

FIG. 2 is a graph illustrating the relationship between the D50 value and the argon gas pressure in a perpendicular magnetic recording medium according to the present invention.

DETAILED DESCRIPTION

Now, the preferred embodiments of the present invention will be described with reference to the accompanying drawings.

Referring to FIG. 1, a perpendicular magnetic recording medium according to an embodiment of the present invention includes a nonmagnetic substrate 1 and a nonmagnetic underlayer 2, a first magnetic layer 3, a second magnetic layer 4, and a protective layer 5 deposited in this order on the nonmagnetic substrate 1. On the protective layer 5, a liquid lubricant layer 6 is formed. A soft magnetic backing layer can be provided between the nonmagnetic substrate 1 and the nonmagnetic underlayer 2 to construct a so-called double-layered perpendicular magnetic recording medium, if desired. A seed layer also can be provided between the substrate 1 and the underlayer 2 to control the alignment of the crystal grains composing the underlayer 2.

The nonmagnetic substrate 1 can be formed of NiP-plated aluminum alloy, strengthened glass, or crystallized glass, which are conventionally used in a substrate of a typical magnetic recording medium. When substrate heating is unnecessary, a plastic substrate made by injection molding of a plastic resin, such as polycarbonate or polyolefin, can be used.

The protective film 5 can be a thin film composed mainly of carbon, for example. The liquid lubricant layer 6 can be composed of a perfluoropolyether lubricant, for example.

The first magnetic layer 3 is a so-called granular magnetic layer. This layer comprises crystal grains of a ferromagnetic alloy of CoCr system and nonmagnetic grain boundaries composed of nonmagnetic metal oxide or metal nitride formed between the crystal grains. The magnetic layer with such a structure can be deposited by sputtering a ferromagnetic metallic target containing the oxide or nitride that constructs the grain boundary. Alternatively, the magnetic layer can be deposited by reactive sputtering a ferromagnetic metallic target under an argon gas atmosphere containing oxygen or nitrogen.

One of the preferred materials for depositing the ferromagnetic crystalline layer is an alloy of CoCr system. To obtain excellent magnetic characteristics and recording performance, it is preferable to add at least one element selected from Pt, Ni, and Ta to the CoCr alloy. To form a stable granular structure, it is preferable to form nonmagnetic grain boundaries using an oxide of at least one element selected from the group consisting of Cr, Co, Si, Al, Ti, Ta, Hf, and Zr.

The thickness of the first magnetic layer 3 can be at least 10 nm to stabilize magnetization bits of the second magnetic layer 4. On the other hand, the thickness of the first magnetic layer can be at most 30 nm to achieve a high recording resolution by decreasing the total thickness of the magnetic recording layer, i.e., the first magnetic layer 3 and the second magnetic layer 4.

The second magnetic layer 4 can be composed of an amorphous film of a rare earth element-transition metal alloy. To achieve a high Ku value, in particular, the second magnetic layer 4 can contain at least one $3d$ transition metal element selected from Ni, Fe, and Co, and also can contain at least one rare earth element selected from Pr, Nd, Gd, Tb, Dy, and Ho in a concentration from 10 at % to 35 at %.

The thickness of the second magnetic layer 4 can be at least 2 nm to hold a high Ku value, and at most 15 nm to achieve a high recording density.

The process of laminating the second magnetic layer 4 can be achieved with a sputtering method. The argon gas pressure in the lamination process can be controlled in the range of 10 mTorr to 200 mTorr, more preferably in the range from 20 mTorr to 150 mTorr to improve the recording performance in a high density recording condition.

Besides these conditions, the ratio a/b of the thickness a of the first magnetic layer to the thickness b of the second magnetic layer can be at least two to stabilize magnetization bits of the second magnetic layer 4. If the first magnetic layer 3 is relatively too thin and the second magnetic layer 4 is relatively too thick, the magnetic energy of the second magnetic layer 4 becomes dominant, and therefore, the contribution of the first magnetic layer 3 to the magnetization behavior of the whole magnetic layer consisting of the first and the second magnetic layers relatively diminishes, reducing the effect that would be brought about by the double-layer structure of the magnetic layer.

The nonmagnetic underlayer 2 can be formed using a material that appropriately controls crystal orientation, grain size, and grain boundary segregation of impurities in the first magnetic layer 3. To appropriately control the alignment of the crystal orientation in the first magnetic layer, in particular, the underlayer can be composed of a metal with a hcp crystal structure selected from Ti, Re, Ru, and Os, or an alloy containing at least one metal selected from Ti, Re, Ru, and Os.

Although the thickness of the nonmagnetic underlayer 2 need not be limited to a specific range, a minimum thickness for controlling the crystal structure of the first magnetic layer 3 is desirable in order to enhance the recording resolution in the case of a double-layered perpendicular magnetic recording medium and to increase the productivity of the perpendicular magnetic recording medium.

A perpendicular magnetic recording medium having above-described structure exhibits an excellent magnetic performance even if the process of heating the substrate is omitted. The substrate heating process has been requisite for manufacturing a conventional magnetic recording medium. The present invention thus simplifies the manufacturing process and reduces the manufacturing cost. Because substrate heating is unnecessary, a nonmagnetic substrate of a plastic resin, such as polycarbonate or polyolefin can be employed according to the present invention.

Some specific examples of preferred embodiments of the present invention will be described below. The examples are merely intended to illustrate the spirit of the present invention, not to limit the scope of the present invention.

In Example 1, the nonmagnetic substrate is a polycarbonate substrate of 3.5" disk made by injection molding. The substrate was cleaned and mounted on a substrate holder of a sputtering device. Without preheating the substrate before the deposition processes, a nonmagnetic underlayer composed of ruthenium (Ru) of 50 nm thickness was deposited to the nonmagnetic substrate by sputtering under an argon gas pressure of 5 mTorr.

Subsequently, a first magnetic layer having a thickness in the range from 5 to 40 nm was deposited by a RF sputtering method using a target of $Co_{76}Cr_{12}Pt_{12}$ with the addition of 10 mol % $SiO_2$ under an argon gas pressure of 5 mTorr. Then, a second magnetic layer having a thickness in the range from 1 to 20 nm was deposited by a RF sputtering method using a target of $Tb_{20}Co_{80}$ under an argon gas pressure of 50 mTorr.

After depositing a carbon protective layer having thickness of 10 nm by a RF sputtering method, the resulting substrate was taken out from the sputtering device. A liquid lubricant was coated to a thickness of 1.5 nm on the carbon protective layer. Thus, a perpendicular magnetic recording medium having the structure shown in FIG. 1 was produced.

Table 1 summarizes the characteristics of the thus laminated set of perpendicular magnetic recording media. This table includes the thickness a of the first magnetic layer, the thickness b of the second magnetic layer, the ratio a/b of the thickness a of the first magnetic layer and the thickness b of the second magnetic layer, the indicator D50 of the maximum magnetic recording density, which is defined by a recording density at which the output is a half of the output of an isolated pulse waveform, and an output signal ratio as an index of thermal stability, which is defined by a ratio of a regenerative output at 1000 seconds after writing to a regenerative output immediately after writing.

The D50 and the output signal ratio were measured using a spinning stand tester and a GMR head with a writing track width 1 μm, a gap length 0.25 μm, a regenerative track width 0.7 μm, and a shield gap length of 0.12 μm. The head flying height was about 20 nm.

As is apparent from Table 1, both high density magnetic recording and excellent thermal stability have been achieved in the perpendicular magnetic recording media in which the thickness of the first magnetic layer is from 10 to 30 nm, the thickness of the second magnetic layer is from 2 to 15 nm, and the ratio a/b of the first magnetic layer thickness a to the second magnetic layer thickness b is two or larger.

TABLE 1

| Thickness (a) of first magnetic layer (nm) | Thickness (b) of second magnetic layer (nm) | (a/b) | D50 (kFCI) | Regeneration output ratio (%) |
|---|---|---|---|---|
| 5 | 2 | 2.5 | 83 | 65 |
| 5 | 5 | 1 | 52 | 90 |
| 10 | 1 | 10 | 160 | 62 |
| 10 | 2 | 5 | 213 | 95 |
| 10 | 5 | 2 | 244 | 98 |
| 10 | 10 | 1 | 66 | 99 |
| 20 | 1 | 20 | 173 | 73 |
| 20 | 2 | 10 | 222 | 97 |
| 20 | 5 | 4 | 266 | 99 |
| 20 | 10 | 2 | 270 | 100 |
| 20 | 15 | 1.3 | 54 | 99 |
| 20 | 20 | 1 | 32 | 100 |
| 30 | 2 | 15 | 198 | 97 |
| 30 | 5 | 6 | 219 | 99 |
| 30 | 10 | 3 | 248 | 100 |
| 30 | 15 | 2 | 210 | 98 |
| 40 | 2 | 20 | 181 | 96 |
| 40 | 10 | 4 | 170 | 98 |
| 40 | 20 | 2 | 147 | 97 |

In Example 2, a set of perpendicular magnetic recording media having the structure as shown in FIG. 1 was produced using various materials for the second magnetic layer. The thickness of the first magnetic layer was maintained at 20 nm, while the thickness of the second magnetic layer was maintained at 5 nm. The conditions of the lamination process were the same as those in Example 1 except for the material of the second magnetic layer. Table 2 summarizes the materials for laminating the second magnetic layer and the coercive force Hc of thus laminated perpendicular magnetic recording media. The coercive force Hc was measured using a vibrating sample magnetometer applying a magnetic field perpendicular to the film surface.

As the results in Table 2 show, it is preferable to laminate the second magnetic layer using a material that contains at least one 3d transition metal selected from Ni, Fe, and Co, and also at least one rare earth element selected from Pr, Nd, Gd, Tb, Dy, and Ho in a concentration from 10 at % to 35 at %.

TABLE 2

| Material of second magnetic layer | Hc (Oe) |
|---|---|
| Co-20%Ce | <100 |
| Co-20%Pr | 5100 |
| Co-20%Nd | 4280 |
| Co-20%Pm | <100 |
| Co-20%Sm | <100 |
| Co-20%Eu | <100 |
| Co-20%Gd | 3090 |
| Co-5%Tb | 620 |
| Co-20%Tb | 8230 |
| Co-30%Tb | 6550 |
| Co-40%Tb | 810 |
| Co-10%Fe-15%Tb | 7240 |
| Co-20%Dy | 6970 |
| Co-20%Ho | 3510 |
| Co-20%Er | <100 |
| Co-20%Tm | <100 |

In Example 3, a set of perpendicular magnetic recording media having the structure as shown in FIG. 1 was produced by laminating the second magnetic layer under various argon gas pressures. The thickness of the first magnetic layer was maintained at 20 nm, while the thickness of the second magnetic layer was maintained at 10 nm. The conditions of the production process were the same as those in Example 1 except for the argon gas pressure in the step of laminating the second magnetic layer.

FIG. 2 is a graph showing the relation between D50 of the thus produced perpendicular magnetic recording media and the argon gas pressure in the lamination process. As the results of FIG. 2 show, it is preferable to control argon gas pressure in the range from 10 mTorr to 200 mTorr, more preferably from 20 mTorr to 150 mTorr, for enhancement of recording performance in a high density recording.

In Example 4, a set of perpendicular magnetic recording media having the structure as shown in FIG. 1 was produced by laminating the nonmagnetic underlayer having a thickness of 50 nm using various materials. The first magnetic layer having a thickness of 20 nm and the second magnetic layer having a thickness of 10 nm were deposited on the nonmagnetic underlayer. The conditions of the production process were the same as those in Example 1 except for the materials of the nonmagnetic underlayer.

Table 3 shows the results of evaluating crystallinity of the first magnetic layer of thus produced perpendicular magnetic recording media by means of an X-ray diffraction method. The value $\Delta\theta_{50}$ is a half-width of a rocking curve of hcp (002) diffraction line obtained with the first magnetic layer. The values of nonmagnetic underlayers of Ta and Cr having a body-centered cubic (bcc) structure are also shown for comparison. Table 3 shows that $\Delta\theta_{50}$ values in the cases employing a nonmagnetic underlayer made of the various materials having the hcp structure are suppressed small as compared with $\Delta\theta_{50}$ values in the cases employing a nonmagnetic underlayer made of Ta and Cr having the bcc structure. The X-ray diffraction peak has become sharp as a result of enhancement of c-axis alignment of the crystal grains composing the first magnetic layer.

TABLE 3

| material of nonmagnetic underlayer | crystal structure of underlayer | $\Delta\theta_{50}$ (degree) |
|---|---|---|
| Ru | hcp | 5.6 |
| Re | hcp | 5.2 |
| Os | hcp | 6.1 |
| Ti | hcp | 7.9 |
| Ru-20%W | hcp | 5.0 |
| Ti-10%Cr | hcp | 7.2 |
| Ta | bcc | 25.0 |
| Cr | bcc | 19.3 |

In the perpendicular magnetic recording medium according to the present invention, the magnetic layer consists of two layers. The first magnetic layer, which is a lower layer, comprises crystal grains of a ferromagnetic alloy of CoCr system and nonmagnetic grain boundaries of mainly oxide or nitride. The second magnetic layer, which is an upper layer, comprises an amorphous film of a rare earth-transition metal alloy. The thickness of the first magnetic layer is in the range from 10 nm to 30 nm, and thickness of the second magnetic layer is in the range of 2 nm to 15 nm. In addition, the ratio a/b of the first magnetic layer thickness a to the second magnetic layer thickness b is at least two. A perpendicular magnetic recording medium having such structure has been demonstrated to exhibit a favorable electromagnetic conversion characteristic under a high recording density condition and excellent thermal stability.

Alignment of the first magnetic layer can be favorably controlled by making the nonmagnetic underlayer using a metal selected from Ti, Re, Ru, and Os having hcp crystal structure, or an alloy containing at least an element selected from Ti, Re, Ru, and Os.

A high Ku value is obtained and thermal stability is improved by making the second magnetic layer to contain at least a 3d transition metal selected from Ni, Fe, and Co, and also at least a rare earth element selected from Pr, Nd, Gd, Tb, Dy, and Ho in a concentration of from 10 at % to 35 at %.

The recording performance in a high density recording is improved by controlling the argon gas pressure in the step of depositing the second magnetic layer in the range from 10 mTorr to 200 mTorr, more preferably from 20 mTorr to 150 mTorr.

Since satisfactory performance can be achieved by manufacturing a perpendicular magnetic recording medium having the above-described structure under the above-described conditions, preheating becomes unnecessary, leading to a simplified manufacturing process and thus reducing the production cost. At the same time, an inexpensive plastic substrate can be employed.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-264516, in its entirety, including the drawings, claims, and the specification thereof, is incorporated herein by reference.

What is claimed is:

1. A perpendicular magnetic recording medium comprising:
   a nonmagnetic substrate; and
   at least a nonmagnetic underlayer, a first magnetic layer, a second magnetic layer, a protective layer, and a liquid lubricant layer sequentially laminated on said substrate,
   wherein said first magnetic layer comprises crystal grains of a ferromagnetic Co—Cr alloy system and nonmagnetic grain boundaries mainly composed of oxide or nitride, and a thickness a of said first magnetic layer is from 10 nm to 30 nm,
   wherein said second magnetic layer comprises an amorphous alloy composed of a rare earth element and a transition metal element, and a thickness b of said second magnetic layer is from 2 nm to 15 nm, and
   wherein a ratio a/b of said thickness a to said thickness b is at least two.

2. A perpendicular magnetic recording medium according to claim 1, wherein said nonmagnetic underlayer is composed of a metal or an alloy having a hexagonal closest-packed crystal structure, said metal being one element selected from a group consisting of Ti, Re, Ru, and Os, and said alloy containing at least one element selected from a group consisting of Ti, Re, Ru, and Os.

3. A perpendicular magnetic recording medium according to claim 1, wherein said second magnetic layer contains at least one metal element selected from a group consisting of Ni, Fe, and Co, and at least one element selected from a group consisting of Pr, Nd, Gd, Tb, Dy, and Ho in a concentration in a range from 10 at % to 35 at %.

4. A perpendicular magnetic recording medium according to claim 1, wherein said nonmagnetic substrate is formed of a plastic resin.

5. A method of manufacturing a perpendicular magnetic recording medium comprising the steps of:
   depositing a nonmagnetic underlayer on a nonmagnetic substrate;
   depositing a first magnetic layer that comprises crystal grains of a ferromagnetic Co—Cr alloy system and nonmagnetic grain boundaries mainly composed of oxide or nitride, and a thickness a of said first magnetic layer being from 10 nm to 30 nm;
   depositing a second magnetic layer that comprises an amorphous alloy composed of a rare earth element and a transition metal element, and a thickness b of said second magnetic layer being from 2 nm to 15 nm;
   depositing a protective film; and
   laminating a liquid lubricant layer,
   wherein a ratio a/b of said thickness a to said thickness b is at least two, and
   wherein each of said depositing steps is conducted while a temperature of said substrate is lower than 80° C. or without preheating said non magnetic substrate.

6. A method of manufacturing a perpendicular magnetic recording medium according to claim 5, wherein said second magnetic layer is sputtered under an argon gas pressure in the range from 10 mTorr to 200 mTorr.

7. A perpendicular magnetic recording medium according to claim 1, wherein said nonmagnetic grain boundaries comprise oxide.

8. A method of manufacturing a perpendicular magnetic recording medium according to claim 5, whrein said nonmagnetic grain boundaries comprise oxide.

* * * * *

UNITED STATES PATENT AND TRADEMARK OFFICE
CERTIFICATE OF CORRECTION

PATENT NO. : 6,794,028 B2
APPLICATION NO. : 10/227621
DATED : September 21, 2004
INVENTOR(S) : Uwazumi et al.

It is certified that error appears in the above-identified patent and that said Letters Patent is hereby corrected as shown below:

Reprint entire patent as shown on attached pages.

This certificate supersedes all previously issued Certificate of Corrections.

Signed and Sealed this

Eighth Day of August, 2006

JON W. DUDAS
*Director of the United States Patent and Trademark Office*

(12) United States Patent
Uwazumi et al.

(10) Patent No.: US 6,794,028 B2
(45) Date of Patent: Sep. 21, 2004

(54) PERPENDICULAR MAGNETIC RECORDING MEDIUM AND A METHOD OF MANUFACTURING THE SAME

(75) Inventors: Hiroyuki Uwazumi, Nagano (JP); Yasushi Sakai, Nagano (JP); Tadaaki Oikawa, Nagano (JP); Miyabi Nakamura, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 10/227,621

(22) Filed: Aug. 23, 2002

(65) Prior Publication Data

US 2003/0064249 A1 Apr. 3, 2003

(30) Foreign Application Priority Data

Aug. 31, 2001 (JP) ................................. 2001-264516

(51) Int. Cl.$^7$ .............................................. G11B 5/66
(52) U.S. Cl. ........................ 428/336; 428/694 TM; 428/694 TS; 428/694 TP; 428/216; 428/900; 427/128; 427/131; 204/192.2
(58) Field of Search .................. 428/694 TS, 694 TM, 428/694 TP, 336, 216, 900; 427/128, 131; 204/192.2

(56) References Cited

U.S. PATENT DOCUMENTS

| | | | | |
|---|---|---|---|---|
| 5,049,451 | A | * | 9/1991 | Lal et al. ................... 428/611 |
| 5,679,473 | A | | 10/1997 | Murayama et al. ....... 428/694 T |
| 5,736,262 | A | * | 4/1998 | Ohkijima et al. .......... 428/611 |
| 5,815,342 | A | * | 9/1998 | Akiyama et al. ......... 360/97.01 |
| 5,981,039 | A | * | 11/1999 | Isono et al. ................ 428/199 |
| 6,086,974 | A | | 7/2000 | Thiele et al. .............. 428/65.3 |
| 6,183,893 | B1 | * | 2/2001 | Futamoto et al. ...... 428/694 TS |
| 6,248,416 | B1 | | 6/2001 | Lambeth et al. ........... 428/65.3 |
| 6,416,839 | B1 | * | 7/2002 | Xuan et al. ............... 428/65.4 |
| 6,447,936 | B1 | * | 9/2002 | Futamoto et al. .... 428/694 TM |
| 6,524,724 | B1 | * | 2/2003 | Cheng et al. ............... 428/611 |
| 6,589,669 | B2 | | 7/2003 | Uwazumi et al. ........... 428/611 |
| 2002/0018917 | A1 | * | 2/2002 | Sakai et al. .......... 428/694 TM |
| 2002/0058159 | A1 | * | 5/2002 | Kubota et al. ........ 428/694 TM |
| 2003/0049495 | A1 | | 3/2003 | Sakai et al. .......... 428/694 TM |
| 2003/0064249 | A1 | * | 4/2003 | Uwazumi et al. ..... 428/694 BA |

FOREIGN PATENT DOCUMENTS

| | | | |
|---|---|---|---|
| JP | 02-227814 A | * | 9/1990 |
| JP | 02-287918 | | 11/1990 |
| JP | 8-255342 | | 10/1996 |
| JP | 2002/025031 A | * | 1/2002 |

OTHER PUBLICATIONS

US RE37,748, 6/2002, Chen et al. (withdrawn)*
JPO Abstract Translation of JP 02-227814-A.*
English Translation of JP 02-227814-A.*
Derwent Abstract translation of JP 2002-025031-A.*
Machine Translation of JP 2002-025031-A.*
"High Performance CoPtCrO Single Layered Perpendicular Media with No Recording Demagnetization", Oikawa et al.:IEEE TRansactions on Magnetics, vol. 36, No. 5; Sep. 2000; pp. 2393-2395.
U.S. Appl. No. 10/227,622, filed Aug. 2002, Uwazumi et al.

* cited by examiner

Primary Examiner—Holly Rickman
(74) Attorney, Agent, or Firm—Rossi & Associates

(57) ABSTRACT

A perpendicular magnetic recording medium has a magnetic recording layer consisting of two layers. The first magnetic layer, which is a lower layer, comprises crystal grains of a ferromagnetic Co—Cr alloy system and nonmagnetic grain boundaries mainly composed of oxide or nitride, and a thickness a of the first magnetic layer is from 10 nm to 30 nm. The second magnetic layer, which is an upper layer, comprises an amorphous alloy film composed of rare earth element—transition metal alloy, and a thickness b of the second magnetic layer is from 2 nm to 15 nm. The ratio a/b of the thickness a of the first magnetic layer and the thickness b of the second magnetic layer is at least two.

8 Claims, 1 Drawing Sheet

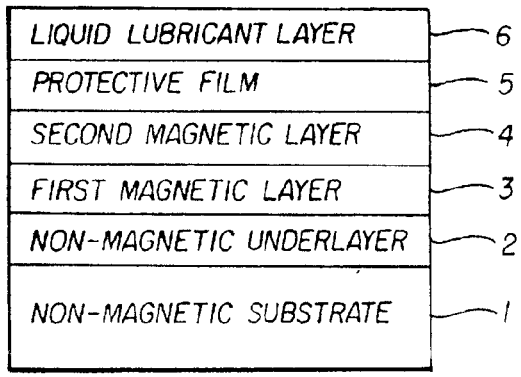

PERPENDICULAR MAGNETIC RECORDING MEDIUM AND A METHOD OF MANUFACTURING THE SAME

BACKGROUND

As a technique for achieving a high density magnetic recording, a perpendicular magnetic recording has been targeted as an alternative to a conventional longitudinal magnetic recording. In a magnetic recording layer of a perpendicular magnetic recording medium, a crystalline film of CoCr alloy having a hexagonal closest packed (hcp) crystal structure principally has been contemplated. To make a perpendicular magnetic recording possible, the crystal alignment is controlled so that the c-axis of each crystal grain is perpendicular to the film surface, i.e., the c-plane parallel to the film surface. For addressing a higher recording density in a perpendicular magnetic recording medium, attempts have been made to minimize the grain size and to reduce the dispersion of the grain size of the CoCr alloy composing the magnetic recording layer, and to reduce magnetic interaction between crystal grains.

A technique has been proposed to achieve a high density recording in a longitudinal magnetic recording medium by reducing magnetic interaction between crystal grains, in which a layer of nonmagnetic and non-metallic substance, such as oxide or nitride, is formed at the grain boundary of a crystal grain composing the magnetic recording layer. This magnetic layer is called "a granular magnetic layer," and is disclosed in Japanese Unexamined Patent Application Publication Hei 8-255342 and U.S. Pat. No. 5,679,473, for example. The magnetic grains in the granular magnetic layer are three dimensionally isolated with each other by the nonmagnetic and non-metallic grain boundary. Since magnetic interaction between the magnetic grains decreases, "zigzag domain wall" in the transition region of a recording bit is suppressed, which is considered to result in noise reduction.

On this background, the use of the granular magnetic layer has been proposed in the magnetic recording layer of a perpendicular magnetic recording medium. For example, IEEE Trans. Mag., vol. 36, p. 2393 (2000) discloses a perpendicular magnetic recording medium that comprises an underlayer of ruthenium (Ru) and a magnetic layer of a CoPtCrO alloy having a granular structure. The document shows that the c-axis alignment of crystal grains composing the magnetic layer enhances as the ruthenium underlayer becomes thicker, bringing about improvement in magnetic characteristics and electromagnetic conversion performances of the magnetic recording layer.

Studies also have been made to make a magnetic recording layer of a perpendicular magnetic recording medium by using an amorphous alloy of a rare earth element and 3d transition metal, such as a TbFeCo alloy.

A perpendicular magnetic recording layer employing the above-mentioned granular magnetic layer exhibits relatively good magnetic properties and electromagnetic conversion characteristics. For further enhancement of magnetic recording density, it is considered necessary to further minimize the grain size in the ferromagnetic layer and to further reduce magnetic interaction between crystal grains by promoting precipitation of oxides or nitrides to the grain boundary.

When the grain size in the magnetic layer is minimized and magnetic interaction between crystal grains is decreased by increasing the quantity of oxide or nitride precipitated at the grain boundary, thermal stability of information recorded on the magnetic recording layer rapidly deteriorates. In the worst case, the problem of so-called "thermal fluctuation" arises, where once recorded information disappears due to the thermal disturbance.

On the other hand, an amorphous film of a rare earth-transition metal alloy has a high perpendicular magnetic anisotropy constant Ku and is free of grain boundary because it is amorphous. Therefore, such an amorphous film has a high thermal stability for a magnetic recording layer. However, free of grain boundary also means lack of a core to hold the once recorded signal within the written place, and the recorded signal is susceptible to the phenomenon of shift or disappearance. These phenomena occur particularly in the magnetic recording at a high frequency. Therefore, such a material is unfavorable for a perpendicular magnetic recording medium for a high density magnetic recording.

Accordingly, there is a need for a perpendicular magnetic recording medium that allows a high density recording, exhibits excellent electromagnetic conversion characteristics, and provides a thermally stable performance. The present invention addresses this need.

SUMMARY OF THE INVENTION

The present invention relates to a perpendicular magnetic recording medium and a method of manufacturing the recording medium. In particular, the present invention relates to a perpendicular magnetic recording medium that can be mounted on an external memory of a computer or other magnetic recording apparatus, and to a method of manufacturing such a recording medium.

According to one aspect of the present invention, a perpendicular magnetic recording medium has a nonmagnetic substrate, and at least a nonmagnetic underlayer, a first magnetic layer, a second magnetic layer, a protective layer, and a liquid lubricant layer sequentially laminated on the substrate. The first magnetic layer has crystal grains of a ferromagnetic Co—Cr alloy system and nonmagnetic grain boundaries substantially comprising oxide or nitride. The thickness a of the first magnetic layer can be in the range of 10 nm to 30 nm. The second magnetic layer comprises an amorphous alloy composed of a rare earth element and a transition metal element. The thickness b of the second magnetic layer can be in the range of 2 nm to 15 nm. The ratio a/b of the thickness a of the first magnetic layer to the thickness b of the second magnetic layer can be at least two.

The nonmagnetic underlayer can be composed of a metal or an alloy of a hexagonal closest-packed crystal structure. The metal can be selected from Ti, Re, Ru, and Os. The alloy can contain at least one element selected from Ti, Re, Ru, and Os.

The second magnetic layer can contain at least one metal element selected from Ni, Fe, and Co, and also can contain at least one element selected from Pr, Nd, Gd, Tb, Dy, and Ho in a concentration from 10 at % to 35 at %.

The nonmagnetic substrate can be composed of a plastic resin.

According to another aspect of the present invention, a method of manufacturing a perpendicular magnetic recording medium comprises the steps of depositing and laminating at least a nonmagnetic underlayer, a first magnetic layer, a second magnetic layer, a protective layer, and a liquid lubricant layer on the nonmagnetic substrate. Each of the steps of depositing these layers are carried out while the temperature of the substrate is lower than 80° C. or without preheating the nonmagnetic substrate.

The second magnetic layer can be deposited by sputtering under an argon gas pressure of 10 mTorr to 200 mTorr.

BRIEF DESCRIPTION OF THE DRAWINGS

FIG. 1 schematically illustrates a cross-sectional view of a structure of a perpendicular magnetic recording medium according to the present invention.

FIG. 2 is a graph illustrating the relationship between the D50 value and the argon gas pressure in a perpendicular magnetic recording medium according to the present invention.

DETAILED DESCRIPTION

Now, the preferred embodiments of the present invention will be described with reference to the accompanying drawings.

Referring to FIG. 1, a perpendicular magnetic recording medium according to an embodiment of the present invention includes a nonmagnetic substrate 1 and a nonmagnetic underlayer 2, a first magnetic layer 3, a second magnetic layer 4, and a protective layer 5 deposited in this order on the nonmagnetic substrate 1. On the protective layer 5, a liquid lubricant layer 6 is formed. A soft magnetic backing layer can be provided between the nonmagnetic substrate 1 and the nonmagnetic underlayer 2 to construct a so-called double-layered perpendicular magnetic recording medium, if desired. A seed layer also can be provided between the substrate 1 and the underlayer 2 to control the alignment of the crystal grains composing the underlayer 2.

The nonmagnetic substrate 1 can be formed of NiP-plated aluminum alloy, strengthened glass, or crystallized glass, which are conventionally used in a substrate of a typical magnetic recording medium. When substrate heating is unnecessary, a plastic substrate made by injection molding of a plastic resin, such as polycarbonate or polyolefin, can be used.

The protective film 5 can be a thin film composed mainly of carbon, for example. The liquid lubricant layer 6 can be composed of a perfluoropolyether lubricant, for example.

The first magnetic layer 3 is a so-called granular magnetic layer. This layer comprises crystal grains of a ferromagnetic alloy of CoCr system and nonmagnetic grain boundaries composed of nonmagnetic metal oxide or metal nitride formed between the crystal grains. The magnetic layer with such a structure can be deposited by sputtering a ferromagnetic metallic target containing the oxide or nitride that constructs the grain boundary. Alternatively, the magnetic layer can be deposited by reactive sputtering a ferromagnetic metallic target under an argon gas atmosphere containing oxygen or nitrogen.

One of the preferred materials for depositing the ferromagnetic crystalline layer is an alloy of CoCr system. To obtain excellent magnetic characteristics and recording performance, it is preferable to add at least one element selected from Pt, Ni, and Ta to the CoCr alloy. To form a stable granular structure, it is preferable to form nonmagnetic grain boundaries using an oxide of at least one element selected from the group consisting of Cr, Co, Si, Al, Ti, Ta, Hf, and Zr.

The thickness of the first magnetic layer 3 can be at least 10 nm to stabilize magnetization bits of the second magnetic layer 4. On the other hand, the thickness of the first magnetic layer can be at most 30 nm to achieve a high recording resolution by decreasing the total thickness of the magnetic recording layer, i.e., the first magnetic layer 3 and the second magnetic layer 4.

The second magnetic layer 4 can be composed of an amorphous film of a rare earth element-transition metal alloy. To achieve a high Ku value, in particular, the second magnetic layer 4 can contain at least one $3d$ transition metal element selected from Ni, Fe, and Co, and also can contain at least one rare earth element selected from Pr, Nd, Gd, Tb, Dy, and Ho in a concentration from 10 at % to 35 at %.

The thickness of the second magnetic layer 4 can be at least 2 nm to hold a high Ku value, and at most 15 nm to achieve a high recording density.

The process of laminating the second magnetic layer 4 can be achieved with a sputtering method. The argon gas pressure in the lamination process can be controlled in the range of 10 mTorr to 200 mTorr, more preferably in the range from 20 mTorr to 150 mTorr to improve the recording performance in a high density recording condition.

Besides these conditions, the ratio a/b of the thickness a of the first magnetic layer to the thickness b of the second magnetic layer can be at least two to stabilize magnetization bits of the second magnetic layer 4. If the first magnetic layer 3 is relatively too thin and the second magnetic layer 4 is relatively too thick, the magnetic energy of the second magnetic layer 4 becomes dominant, and therefore, the contribution of the first magnetic layer 3 to the magnetization behavior of the whole magnetic layer consisting of the first and the second magnetic layers relatively diminishes, reducing the effect that would be brought about by the double-layer structure of the magnetic layer.

The nonmagnetic underlayer 2 can be formed using a material that appropriately controls crystal orientation, grain size, and grain boundary segregation of impurities in the first magnetic layer 3. To appropriately control the alignment of the crystal orientation in the first magnetic layer, in particular, the underlayer can be composed of a metal with a hcp crystal structure selected from Ti, Re, Ru, and Os, or an alloy containing at least one metal selected from Ti, Re, Ru, and Os.

Although the thickness of the nonmagnetic underlayer 2 need not be limited to a specific range, a minimum thickness for controlling the crystal structure of the first magnetic layer 3 is desirable in order to enhance the recording resolution in the case of a double-layered perpendicular magnetic recording medium and to increase the productivity of the perpendicular magnetic recording medium.

A perpendicular magnetic recording medium having above-described structure exhibits an excellent magnetic performance even if the process of heating the substrate is omitted. The substrate heating process has been requisite for manufacturing a conventional magnetic recording medium. The present invention thus simplifies the manufacturing process and reduces the manufacturing cost. Because substrate heating is unnecessary, a nonmagnetic substrate of a plastic resin, such as polycarbonate or polyolefin can be employed according to the present invention.

Some specific examples of preferred embodiments of the present invention will be described below. The examples are merely intended to illustrate the spirit of the present invention, not to limit the scope of the present invention.

In Example 1, the nonmagnetic substrate is a polycarbonate substrate of 3.5" disk made by injection molding. The substrate was cleaned and mounted on a substrate holder of a sputtering device. Without preheating the substrate before the deposition processes, a nonmagnetic underlayer composed of ruthenium (Ru) of 50 nm thickness was deposited to the nonmagnetic substrate by sputtering under an argon gas pressure of 5 mTorr.

Subsequently, a first magnetic layer having a thickness in the range from 5 to 40 nm was deposited by a RF sputtering method using a target of $Co_{76}Cr_{12}Pt_{12}$ with the addition of 10 mol % $SiO_2$ under an argon gas pressure of 5 mTorr. Then, a second magnetic layer having a thickness in the range from 1 to 20 nm was deposited by a RF sputtering method using a target of $Tb_{20}Co_{80}$ under an argon gas pressure of 50 mTorr.

After depositing a carbon protective layer having thickness of 10 nm by a RF sputtering method, the resulting substrate was taken out from the sputtering device. A liquid lubricant was coated to a thickness of 1.5 nm on the carbon protective layer. Thus, a perpendicular magnetic recording medium having the structure shown in FIG. 1 was produced.

Table 1 summarizes the characteristics of the thus laminated set of perpendicular magnetic recording media. This table includes the thickness a of the first magnetic layer, the thickness b of the second magnetic layer, the ratio a/b of the thickness a of the first magnetic layer and the thickness b of the second magnetic layer, the indicator D50 of the maximum magnetic recording density, which is defined by a recording density at which the output is a half of the output of an isolated pulse waveform, and an output signal ratio as an index of thermal stability, which is defined by a ratio of a regenerative output at 1000 seconds after writing to a regenerative output immediately after writing.

The D50 and the output signal ratio were measured using a spinning stand tester and a GMR head with a writing track width 1 μm, a gap length 0.25 μm, a regenerative track width 0.7 μm, and a shield gap length of 0.12 μm. The head flying height was about 20 nm.

As is apparent from Table 1, both high density magnetic recording and excellent thermal stability have been achieved in the perpendicular magnetic recording media in which the thickness of the first magnetic layer is from 10 to 30 nm, the thickness of the second magnetic layer is from 2 to 15 nm, and the ratio a/b of the first magnetic layer thickness a to the second magnetic layer thickness b is two or larger.

TABLE 1

| Thickness (a) of first magnetic layer (nm) | Thickness (b) of second magnetic layer (nm) | (a/b) | D50 (kFCI) | Regeneration output ratio (%) |
|---|---|---|---|---|
| 5 | 2 | 2.5 | 83 | 65 |
| 5 | 5 | 1 | 52 | 90 |
| 10 | 1 | 10 | 160 | 62 |
| 10 | 2 | 5 | 213 | 95 |
| 10 | 5 | 2 | 244 | 98 |
| 10 | 10 | 1 | 66 | 99 |
| 20 | 1 | 20 | 173 | 73 |
| 20 | 2 | 10 | 222 | 97 |
| 20 | 5 | 4 | 266 | 99 |
| 20 | 10 | 2 | 270 | 100 |
| 20 | 15 | 1.3 | 54 | 99 |
| 20 | 20 | 1 | 32 | 100 |
| 30 | 2 | 15 | 198 | 97 |
| 30 | 5 | 6 | 219 | 99 |
| 30 | 10 | 3 | 248 | 100 |
| 30 | 15 | 2 | 210 | 98 |
| 40 | 2 | 20 | 181 | 96 |
| 40 | 10 | 4 | 170 | 98 |
| 40 | 20 | 2 | 147 | 97 |

In Example 2, a set of perpendicular magnetic recording media having the structure as shown in FIG. 1 was produced using various materials for the second magnetic layer. The thickness of the first magnetic layer was maintained at 20 nm, while the thickness of the second magnetic layer was maintained at 5 nm. The conditions of the lamination process were the same as those in Example 1 except for the material of the second magnetic layer. Table 2 summarizes the materials for laminating the second magnetic layer and the coercive force Hc of thus laminated perpendicular magnetic recording media. The coercive force Hc was measured using a vibrating sample magnetometer applying a magnetic field perpendicular to the film surface.

As the results in Table 2 show, it is preferable to laminate the second magnetic layer using a material that contains at least one 3d transition metal selected from Ni, Fe, and Co, and also at least one rare earth element selected from Pr, Nd, Gd, Tb, Dy, and Ho in a concentration from 10 at % to 35 at %.

TABLE 2

| Material of second magnetic layer | Hc (Oe) |
|---|---|
| Co-20%Ce | <100 |
| Co-20%Pr | 5100 |
| Co-20%Nd | 4280 |
| Co-20%Pm | <100 |
| Co-20%Sm | <100 |
| Co-20%Eu | <100 |
| Co-20%Gd | 3090 |
| Co-5%Tb | 620 |
| Co-20%Tb | 8230 |
| Co-30%Tb | 6550 |
| Co-40%Tb | 810 |
| Co-10%Fe-15%Tb | 7240 |
| Co-20%Dy | 6970 |
| Co-20%Ho | 3510 |
| Co-20%Er | <100 |
| Co-20%Tm | <100 |

In Example 3, a set of perpendicular magnetic recording media having the structure as shown in FIG. 1 was produced by laminating the second magnetic layer under various argon gas pressures. The thickness of the first magnetic layer was maintained at 20 nm, while the thickness of the second magnetic layer was maintained at 10 nm. The conditions of the production process were the same as those in Example 1 except for the argon gas pressure in the step of laminating the second magnetic layer.

FIG. 2 is a graph showing the relation between D50 of the thus produced perpendicular magnetic recording media and the argon gas pressure in the lamination process. As the results of FIG. 2 show, it is preferable to control argon gas pressure in the range from 10 mTorr to 200 mTorr, more preferably from 20 mTorr to 150 mTorr, for enhancement of recording performance in a high density recording.

In Example 4, a set of perpendicular magnetic recording media having the structure as shown in FIG. 1 was produced by laminating the nonmagnetic underlayer having a thickness of 50 nm using various materials. The first magnetic layer having a thickness of 20 nm and the second magnetic layer having a thickness of 10 nm were deposited on the nonmagnetic underlayer. The conditions of the production process were the same as those in Example 1 except for the materials of the nonmagnetic underlayer.

Table 3 shows the results of evaluating crystallinity of the first magnetic layer of thus produced perpendicular magnetic recording media by means of an X-ray diffraction method. The value $\Delta\theta_{50}$ is a half-width of a rocking curve of hcp (002) diffraction line obtained with the first magnetic layer. The values of nonmagnetic underlayers of Ta and Cr having a body-centered cubic (bcc) structure are also shown for comparison. Table 3 shows that $\Delta\theta_{50}$ values in the cases employing a nonmagnetic underlayer made of the various materials having the hcp structure are suppressed small as compared with $\Delta\theta_{50}$ values in the cases employing a nonmagnetic underlayer made of Ta and Cr having the bcc structure. The X-ray diffraction peak has become sharp as a result of enhancement of c-axis alignment of the crystal grains composing the first magnetic layer.

TABLE 3

| material of nonmagnetic underlayer | crystal structure of underlayer | $\Delta\theta_{50}$ (degree) |
|---|---|---|
| Ru | hcp | 5.6 |
| Re | hcp | 5.2 |
| Os | hcp | 6.1 |
| Ti | hcp | 7.9 |
| Ru-20%W | hcp | 5.0 |
| Ti-10%Cr | hcp | 7.2 |
| Ta | bcc | 25.0 |
| Cr | bcc | 19.3 |

In the perpendicular magnetic recording medium according to the present invention, the magnetic layer consists of two layers. The first magnetic layer, which is a lower layer, comprises crystal grains of a ferromagnetic alloy of CoCr system and nonmagnetic grain boundaries of mainly oxide or nitride. The second magnetic layer, which is an upper layer, comprises an amorphous film of a rare earth-transition metal alloy. The thickness of the first magnetic layer is in the range from 10 nm to 30 nm, and thickness of the second magnetic layer is in the range of 2 nm to 15 nm. In addition, the ratio a/b of the first magnetic layer thickness a to the second magnetic layer thickness b is at least two. A perpendicular magnetic recording medium having such structure has been demonstrated to exhibit a favorable electromagnetic conversion characteristic under a high recording density condition and excellent thermal stability.

Alignment of the first magnetic layer can be favorably controlled by making the nonmagnetic underlayer using a metal selected from Ti, Re, Ru, and Os having hcp crystal structure, or an alloy containing at least an element selected from Ti, Re, Ru, and Os.

A high Ku value is obtained and thermal stability is improved by making the second magnetic layer to contain at least a 3d transition metal selected from Ni, Fe, and Co, and also at least a rare earth element selected from Pr, Nd, Gd, Tb, Dy, and Ho in a concentration of from 10 at % to 35 at %.

The recording performance in a high density recording is improved by controlling the argon gas pressure in the step of depositing the second magnetic layer in the range from 10 mTorr to 200 mTorr, more preferably from 20 mTorr to 150 mTorr.

Since satisfactory performance can be achieved by manufacturing a perpendicular magnetic recording medium having the above-described structure under the above-described conditions, preheating becomes unnecessary, leading to a simplified manufacturing process and thus reducing the production cost. At the same time, an inexpensive plastic substrate can be employed.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2001-264516, in its entirety, including the drawings, claims, and the specification thereof, is incorporated herein by reference.

What is claimed is:

1. A perpendicular magnetic recording medium comprising:
   a nonmagnetic substrate; and
   at least a nonmagnetic underlayer, a first magnetic layer, a second magnetic layer, a protective layer, and a liquid lubricant layer sequentially laminated on said substrate,
   wherein said first magnetic layer comprises crystal grains of a ferromagnetic alloy containing Co and Cr, and nonmagnetic grain boundaries comprising oxide or nitride, and a thickness a of said first magnetic layer is from 10 nm to 30 nm,
   wherein said second magnetic layer comprises an amorphous alloy composed of a rare earth element and a transition metal element, and a thickness b of said second magnetic layer is from 2 nm to 15 nm, and
   wherein a ratio a/b of said thickness a to said thickness b is at least two.

2. A perpendicular magnetic recording medium according to claim 1, wherein said nonmagnetic underlayer is composed of a metal or an alloy having a hexagonal closest-packed crystal structure, said metal being one element selected from a group consisting of Ti, Re, Ru, and Os, and said alloy containing at least one element selected from a group consisting of Ti, Re, Ru, and Os.

3. A perpendicular magnetic recording medium according to claim 1, wherein said second magnetic layer contains at least one metal element selected from a group consisting of Ni, Fe, and Co, and at least one element selected from a group consisting of Pr, Nd, Gd, Tb, Dy, and Ho in a concentration in a range from 10 at % to 35 at %.

4. A perpendicular magnetic recording medium according to claim 1, wherein said nonmagnetic substrate is formed of a plastic resin.

5. A method of manufacturing a perpendicular magnetic recording medium comprising the steps of:
   depositing a nonmagnetic underlayer on a nonmagnetic substrate;
   depositing a first magnetic layer that comprises crystal grains of a ferromagnetic alloy containing Co-Cr, and nonmagnetic grain boundaries comprising oxide or nitride, and a thickness a of said first magnetic layer being from 10 nm to 30 nm;
   depositing a second magnetic layer that comprises an amorphous alloy composed of a rare earth element and a transition metal element, and a thickness b of said second magnetic layer being from 2 nm to 15 nm;
   depositing a protective film; and
   laminating a liquid lubricant layer,
   wherein a ratio a/b of said thickness a to said thickness b is at least two, and
   wherein each of said depositing steps is conducted while a temperature of said substrate is lower than 80° C. or without preheating said non magnetic substrate.

6. A method of manufacturing a perpendicular magnetic recording medium according to claim 5, wherein said second magnetic layer is sputtered under an argon gas pressure in the range from 10 mTorr to 200 mTorr.

7. A perpendicular magnetic recording medium according to claim 1, wherein said nonmagnetic grain boundaries comprise oxide.

8. A method of manufacturing a perpendicular magnetic recording medium according to claim 5, whrein said nonmagnetic grain boundaries comprise oxide.

* * * * *